United States Patent [19]
Fujii et al.

[11] Patent Number: 6,069,745
[45] Date of Patent: May 30, 2000

[54] LENS BARRELL

[75] Inventors: Naoki Fujii, Hachioji; Shigeo Hayashi, Okaya, both of Japan

[73] Assignee: Olympus Optical Co., Ltd., Japan

[21] Appl. No.: 09/243,180

[22] Filed: Feb. 2, 1999

[30] Foreign Application Priority Data

Feb. 4, 1998 [JP] Japan ................................ H10-023595
Feb. 4, 1998 [JP] Japan ................................ H10-023596

[51] Int. Cl.[7] ....................................................... G02B 7/02
[52] U.S. Cl. ........................................... 359/694; 359/704
[58] Field of Search .................................... 359/694, 704, 359/699–701, 823

[56] References Cited

FOREIGN PATENT DOCUMENTS 7-174956  7/1995  Japan .

Primary Examiner—Scott J. Sugarman
Assistant Examiner—Timothy Lee Younggil
Attorney, Agent, or Firm—Ostrolenk, Faber, Gerb & Soffen, LLP

[57] ABSTRACT

A lens barrel has a plurality of moving frames that move along the optical axis of lenses. The lens barrel comprises a first moving frame, a second moving frame, and an interlocking unit. The first moving frame moves along the optical axis. The second moving frame moves along the optical axis within a range smaller than the movable range of the first moving frame. The interlocking unit formed on the first moving frame interlocks the second moving frame with the first moving frame and moves the second moving frame responsively to the movement along the optical axis made by the first moving frame. The movable range of the first moving frame falls into a range of interlocking within which the second moving frame is moved interlocked with the first moving frame, and a range of non-interlocking within which the second moving frame is not interlocked with the first moving frame. Consequently, a moving mechanism for moving the plurality of lens frames can be simplified. Eventually, the lens barrel can be designed compactly.

28 Claims, 13 Drawing Sheets

FIG.11
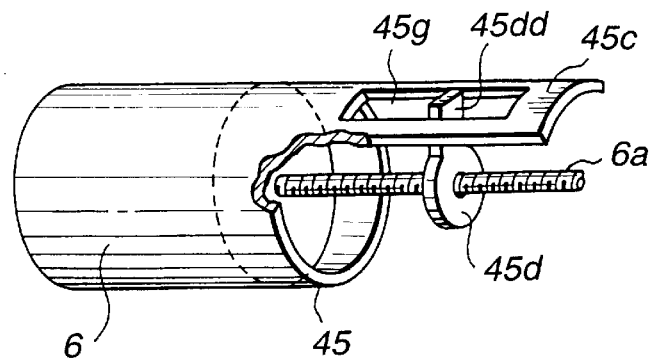
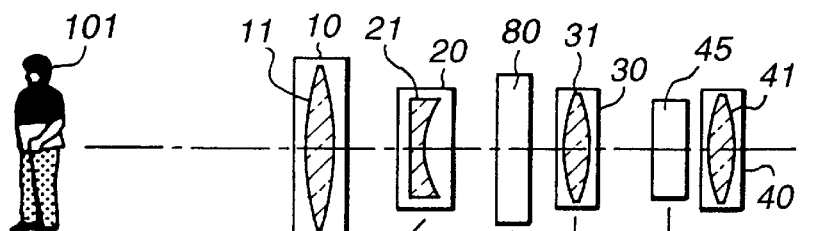
FIG.12(A)
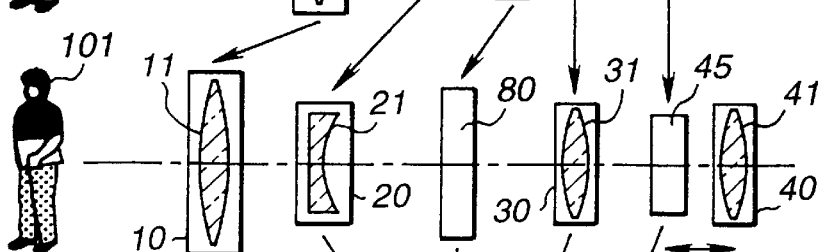
FIG.12(B)
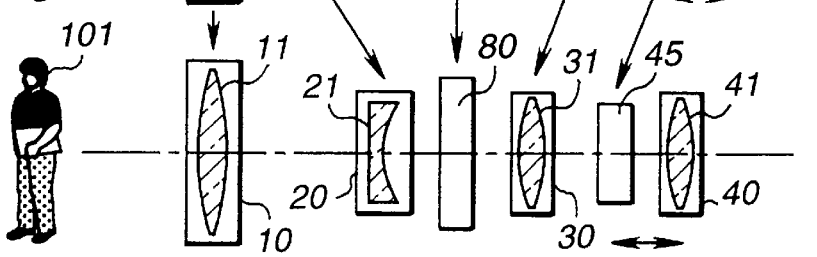
FIG.12(C)

COLLAPSED STATE

WIDE-ANGLE STATE

LENS BARREL

BACKGROUND OF THE INVENTION

1. Field of the Invention

The present invention relates to a lens barrel. More particularly, this invention is concerned with a lens barrel adaptable to a camera of a collapsible type photographic lens or a two-focus type, and a camera with a macro zoom function. The camera of a collapsible type photographic lens or a two-focus type has a plurality of moving frames, which hold groups of photographic lenses, moved independently along the optical axis of the lenses, and thus assumes two different states.

2. Description of the Related Art

Photography apparatuses include a typical compact camera for performing photography using, for example, a silver film, and an electronic still camera (hereinafter an electronic camera) for recording an image signal, image information, or the like output from an imaging means such as a CCD. The photography apparatuses (hereinafter these types of cameras are generically called cameras) are normally carried in one's bag or the like for use. What counts for much in designing the cameras is therefore how to improve portability.

Among members constituting such a camera, a lens barrel occupies a large portion of the camera in terms of volume and weight. The lens barrel is composed of a plurality of lens frames for holding a photographic optical system so that the photographic optical system can move along the optical axis thereof. When the lens barrel itself is designed compactly, it will contribute greatly to realization of a compact camera and improvement of portability.

In recent years, a so-called variable-power photographic optical system (hereinafter a zoom lens) capable of continuously varying its focal length has been widely adopted as a photographic optical system employed in cameras. Moreover, there is an increasing demand for higher powers or higher zooming ratios.

However, numerous photographic lenses and numerous lens frames for holding the photographic lenses are needed to construct a zoom lens barrel. The number of members constituting the zoom lens barrel increases, contrary to the trend towards a compact zoom lens barrel. Furthermore, when an attempt is made to realize a zoom lens offering a high power, the lens barrel tends to get large.

For improving the portability of cameras while adopting a zoom lens, various means including a photographic lens-collapsible lens barrel have been proposed and put to practical use. The photographic lens-collapsible lens barrel can be set to two states by moving a plurality of lens frames. The two states are a photographic state in which photography can be performed and a non-photographic state (collapsed state) in which a camera is being carried.

In the cameras, when photography is carried out, part of the lens barrel is thrust out from the face of a camera body (photographic state). When the camera is being carried or photography is not carried out, the plurality of lens frames constituting the lens barrel is moved independently in order to narrow the spacing between adjoining ones of the lens frames. Moreover, the lens barrel itself is stowed in the camera body (collapsed).

In the photographic lens-collapsible cameras, when photography is not carried out, the spacing between adjoining ones of the plurality of lens frames to be stowed in the lens barrel must be narrowed as much as possible. It is therefore necessary to make the overall length of the photographic optical system as short as possible.

However, when the overall length of the photographic optical system in the lens barrel employed in the conventional collapsible cameras is made as short as possible, a moving mechanism and a restricting member are required. The moving mechanism helps move all the moving frames out of the plurality of lens frames, which can move along the optical axis thereof, from positions predetermined for photography to positions predetermined for non-photography. The restricting member restricts turning of the moving mechanism.

In this case, the magnitudes of movements made by the moving frames and the movements of the moving frames are different mutually. Each moving frame must therefore be provided with an independent moving mechanism and restricting member. This poses problems. Specifically, since the moving mechanisms realized with cam mechanisms or the like must be arranged in the lens barrel, the lens barrel must be made large. Moreover, the lens barrel must be large enough to accommodate the complex mechanisms and the camera using the lens barrel must also be designed large. Besides, the cost of manufacturing increases.

For avoiding the problems, moving frames that contribute little to shortening of the overall length of the photographic optical system are not provided with a dedicated moving mechanism. The moving frames are designed not to be able to move (fixed). This is a conventionally adopted means. Thus, efforts have been made to eliminate factors making the lens barrel larger. However, the effect of the means is limited.

Moreover, in the conventional lens barrel for the photographic lens-collapsible cameras, a guide shaft composed of a plurality of elongated axes is usually used as a movement restricting member. The movement restricting member supports the moving frames including the lens frames that move in the lens barrel, guides the movements along the optical axis of the moving frames, and restricts the turnings of the moving frames.

However, when the guide shaft is used as the movement restricting member for restricting the movements of the moving frames, the guide shaft itself and a bearing member for bearing the guide shaft must be arranged along the optical axis. This becomes a factor of obstructing realization of a compact and short lens barrel.

Moreover, the guide shaft composed of elongated axes is placed in a locking frame for supporting the moving frames arranged in the lens barrel. This poses a problem in that the layout of the moving frames and the movable range thereof are limited.

In an effort to shorten the lens barrel, a means for shortening the guide shaft has been proposed in, for example, Japanese Patent Application No. 7-174956. Specifically, a lens frame interposed between two lens frames holding two groups of photographic lenses is provided with a bearing for bearing the guide shaft.

On the other hand, an effort has been made to independently move the moving frames including a plurality of lens frames along the optical axis. Specifically, a cam frame serving as a substantially cylindrical moving mechanism has generally been employed in conventional lens barrels. The cam frame used in practice has a plurality of cam grooves formed on the outer circumference thereof so that it can drive three or more moving frames including lens frames. The cam grooves are shaped to match the moving frames. Cam pins or the like formed on the plurality of moving frames are engaged with the plurality of cam grooves.

In this case, the plurality of cam grooves is formed on the outer circumference of the cam frame. This poses a problem in that the rigidity of the cam frame itself deteriorates. For ensuring the required rigidity for the cam frame itself, it is necessary to increase the thickness of a cylindrical member used to form the cam frame.

On the other hand, as for conventional lens barrels, a proposal has been made to decrease the diameter of a lens barrel for realizing a compact lens barrel.

For example, a lens barrel proposed by the present applicant is described in Japanese Patent Application No. 9-244371. In this case, a driving means such as a motor or a driving force conveying mechanism, which drives a cam frame, is stowed in a locking frame for supporting the cam frame. A gear portion for driving the cam frame is formed on the inner circumference of the cam frame. A driving output of the driving means is conveyed to the gear portion on the cam frame by way of the driving force conveying mechanism. The cam frame is thus turned.

Furthermore, according to the Japanese Patent Application No. 9-244371, a moving frame for holding any member other than groups of photographic lenses, for example, a motor holding frame for holding an AF motor is arranged along the optical axis together with other lens frames. A guide shaft serving as a direction-of-movement restricting member is attached to a moving frame such as the motor holding frame. The guide shaft is utilized in order to restrict the movements of moving frames such as lens frames located before and after the moving frame such as the motor holding frame.

In the conventional lens barrels, a cylindrical member used to form a cam frame may be made thicker so that the cam frame itself can maintain required rigidity. In this case, the dimension in a radial direction of the lens barrel gets larger. Consequently, the lens barrel gets larger.

Moreover, when the gear portion is, like that in the means proposed in the Japanese Patent Application No. 9-244371, formed on the inner circumference of the cam frame, it will contribute to a decrease in diameter of a lens barrel. However, the layout of cam grooves to be cut in the inner circumference of the cam frame may be limited. Since the cam grooves and gear portion are formed in and on the inner circumference of the cam frame, the structure of dies used to manufacture the cam frame gets complex. This leads to an increase in cost of manufacturing.

Furthermore, the moving frame for holding an AF motor may be arranged on the optical axis together with other moving frames including a plurality of lens frames. This poses a problem in that the overall length of the lens barrel increases.

On the other hand, aside from the conventional photographic lens-collapsible cameras, there are a so-called two-focus camera and a so-called macro zoom selectable camera. In the two-focus camera, a lens barrel to be set to two states by moving the moving frames including a plurality of lens frames can selectively offer two focal lengths. The macro zoom selectable camera selectively enables normal photography and macro zoom photography. Normal photography is carried out with a lens barrel located in a normal photography zone. Macro zoom photography is carried out with the lens barrel located in a photography zone located closer to an object, that is, in a macro zoom zone. These lens barrels have an independent moving mechanism provided for every plurality of moving frames that move along the optical axis. Various kinds of such lens barrels have been put to practical use in the past.

However, members other than a photographic optical system, for example, component members of a shutter mechanism and diaphragm mechanism are incorporated in a lens barrel in any conventional camera. In this case, these component members may be united with a lens frame or locked at predetermined positions in the lens barrel.

In the lens barrels employed in the cameras having the collapsing mechanism, two-focus mechanism, and macro zoom mechanism, a moving mechanism for moving the moving frames to be arranged in a lens barrel may be simplified in order to design the lens barrel compactly. However, this poses a problem in that such component members as the shutter mechanism and diaphragm mechanism cannot help being placed at positions in a lens barrel that are not always optimal in terms of optical designing.

SUMMARY OF THE INVENTION

The present invention also provides a lens barrel of, for example, a collapsible type or a two-focus type being set to two different states by moving a plurality of lens frames. When the plurality of lens frames and a moving mechanism therefor are simplified, it will contribute to realization of a compact camera.

Moreover, the present invention provides a lens barrel being set to two different states by moving a plurality of lens frames, for example, a collapsible lens barrel or two-focus lens barrel. But for a complex mechanism, the overall length of the lens barrel can be shortened and the diameter thereof can be reduced. Eventually, the lens barrel can be designed compactly.

The present invention also provides a lens barrel in which a guide shaft serving as a movement restricting member for restricting the movements of lens frames (moving frames) inside a barrel is not included particularly in order to reduce the number of parts. A factor making the moving mechanism or the like complex or large is thus eliminated. Consequently, the cost of manufacturing is reduced.

Furthermore, the present invention provides a lens barrel in which a shutter mechanism and diaphragm mechanism are not stationary but movable. These mechanisms are constructed independently of lens frames. The mechanisms are thus placed at predetermined positions that are optimal in terms of optical designing. Moreover, a factor making the lens barrel large or complex can be eliminated.

Briefly, according to the first aspect of the present invention, a lens barrel having a plurality of moving frames comprises a first moving frame, a second moving frame, and an interlocking means. The first moving frame is movable along the optical axis of lenses. The second moving frame is movable along the optical axis within a range smaller than a movable range within which the first moving frame is movable. The interlocking means is formed on the first moving frame, and causes the second moving frame to move responsively to the movement along the optical axis of the first moving frame. The movable range of the first moving frame falls into a range of interlocking within which the second moving frame is moved interlocked with the first moving frame, and a range of non-interlocking within which the second moving frame is not interlocked with the first moving frame.

Moreover, according to the second aspect of the present invention, a lens barrel comprises a first lens frame, a cam frame, a locking frame, and a mounting frame. The first lens frame is shaped substantially link a cylinder, having cam engagement members formed on the inner surface of the cylinder, and having guide members formed on the outer surface of the cylinder. The cam frame is placed in contact with the inner circumference of the first lens frame, and has cam members, which are engaged with the cam engagement members, formed on the outer circumference thereof. The locking frame is placed in contact with the inner circumference of the cam frame, and has moving frames other than the first lens frame arranged inside it. The mounting frame has extensions in the inner surface of each of which a guide groove is cut as an integral part thereof. The extensions are extending along the optical axis. The guide members of the first lens fame are engaged with the guide grooves. The mounting frame holds the locking frame. When the guide members are engaged with the guide grooves in the mounting frame, the turning of the first lens frame is restricted. When the cam engagement members are engaged with the cam members of the cam frame, the first lens frame is moved along the optical axis alone.

According to the third aspect of the present invention, a lens barrel comprises a lens frame, an auxiliary frame, and a locking frame. The lens frame moves along the optical axis of lenses and holds the lenses. The auxiliary frame moves along the optical axis but not hold any lens. The locking frame is shaped substantially like a cylinder. The lens frame and auxiliary frame are stowed in the locking frame. The auxiliary frame is located away from the optical axis for fear it may intercept a light beam passing through the locking frame. A direction-of-movement restricting means for restricting the movement along the optical axis of the auxiliary frame is formed as an integral part of the locking frame inside the locking frame.

These aspects of the present invention and other aspects thereof and advantages thereof will be apparent from the description below.

According to the present invention, there is provided a lens barrel of a collapsible type or a two-focus type to be set to two different states by moving a plurality of lens frames. The plurality of lens frames and a moving mechanism therefor can be simplified. Consequently, a camera can be designed compactly.

Moreover, according to the present invention, there is provided a lens barrel of a collapsible type or a zoom type having a plurality of lens frames thereof moved for use. A complex mechanism need not be included but the overall length of the lens barrel is shortened and the diameter thereof is reduced. This contributes to realization of a compact lens barrel.

According to the present invention, there is provided a lens barrel in which a guide shaft serving as a direction-of-movement restricting member for restricting lens frames (moving frames) that move along the optical axis of lenses inside the lens barrel is not, in particular, included. Thus, the number of parts thereof is decreased, and factors making a moving mechanism complex and large are eliminated. Consequently, the cost of manufacturing can be reduced.

Furthermore, according to the present invention, there is provided a lens barrel in which a shutter mechanism and diaphragm mechanism are not stationary but movable. The shutter mechanism and diaphragm mechanism are constructed independently of lens frames, and placed at optimal predetermined positions inside a camera. A moving mechanism is included to eliminate factors of making the lens barrel large and complex.

BRIEF DESCRIPTION OF THE DRAWINGS

FIG. 11 is an enlarged oblique view showing the fourth group auxiliary frame and AF motor of the lens barrel shown in FIG. 1 with the fourth group auxiliary frame left cutaway;

FIGS. 12A to 12C conceptually show the positional relationships of moving frames with the lens barrel shown in FIG. 1 set to the respective states; FIG. 12A shows the collapsed state in which the moving frames are located at stowed positions that are non-photographic positions; FIG. 12B shows a (wide-angle) state in which the moving frames are located at short-focus (wide-angle) positions that are photographic positions; and FIG. 12C shows a state (telephoto state) in which the moving frames are located at long-focus (or telephoto) positions that are photographic positions;

FIG. 13A shows the collapsed state in which the frames are located at the non-photographic positions; FIG. 13B shows a state (wide-angle state) in which the frames are located at the photographic positions;

DESCRIPTION OF THE PREFERRED EMBODIMENTS

Figure 1:
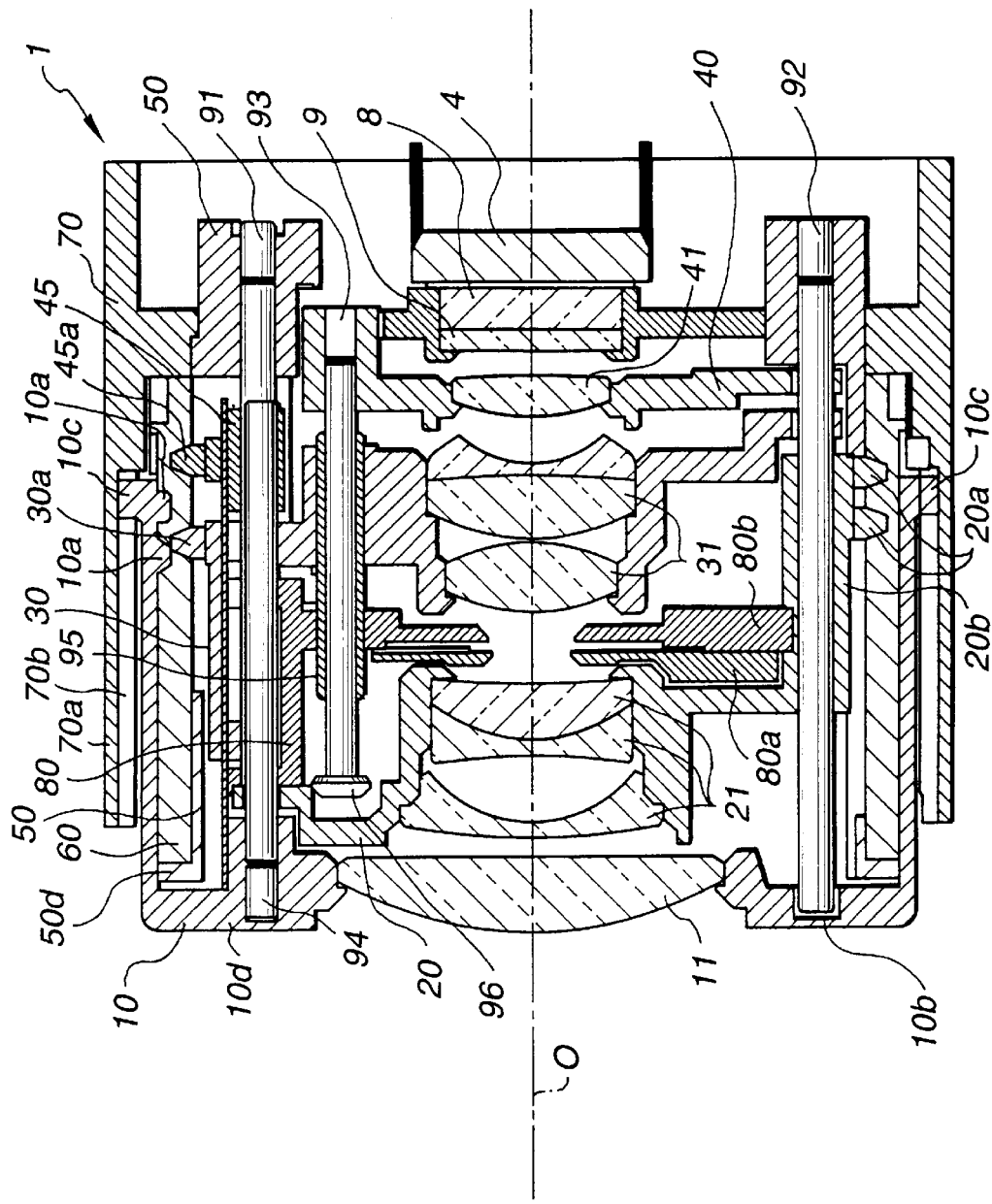
FIG. 1 is a longitudinal sectional view showing major component members of a lens barrel in accordance with the first embodiment of the present invention, wherein the lens barrel is set to a collapsed state and located at a non-photographic position.
Figure 2:
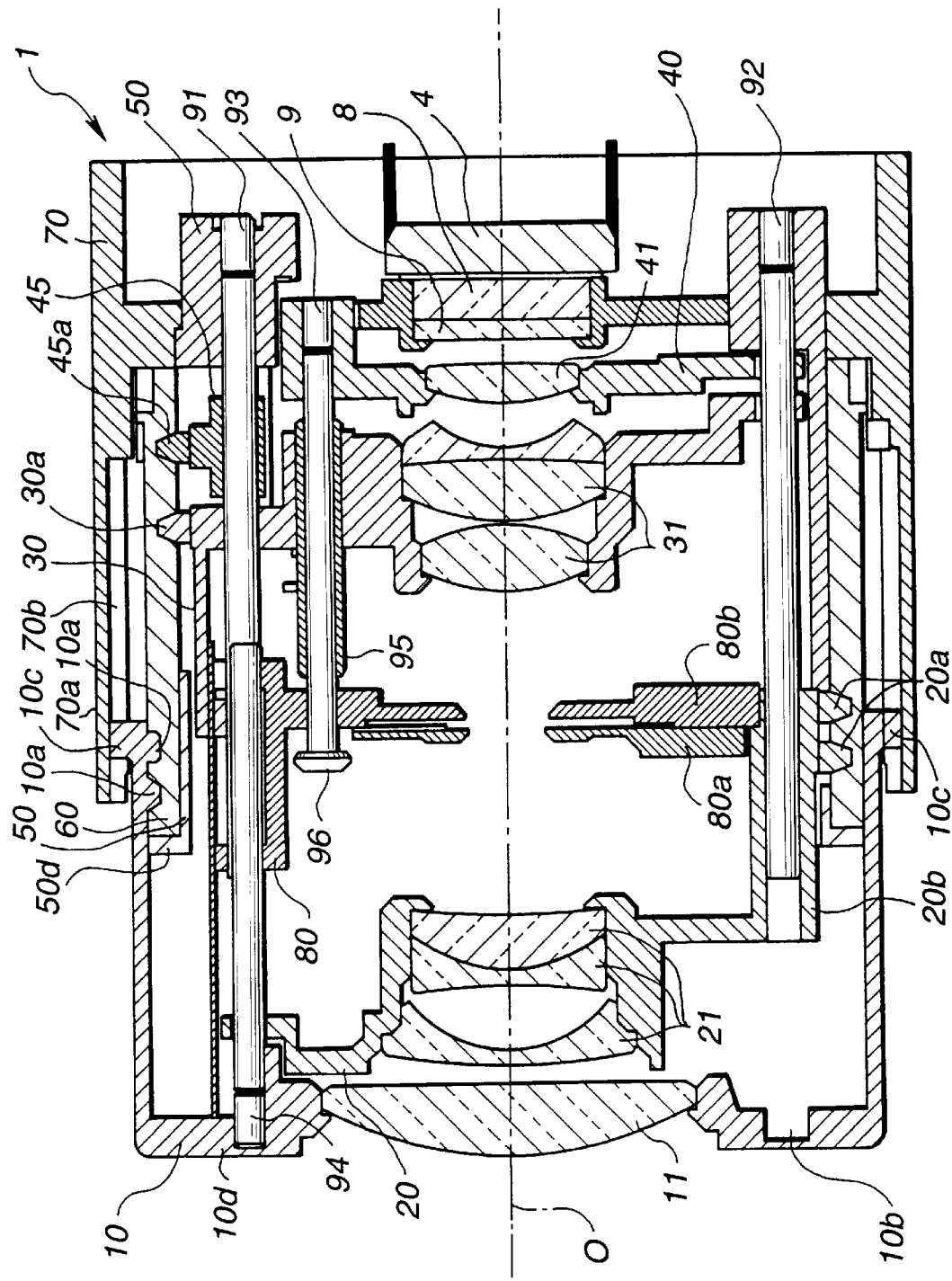
FIG. 2 is a longitudinal sectional view showing the major component members of the lens barrel shown in FIG. 1, wherein the lens barrel is set to a wide-angle state and located at a photographic position.
Figure 3:
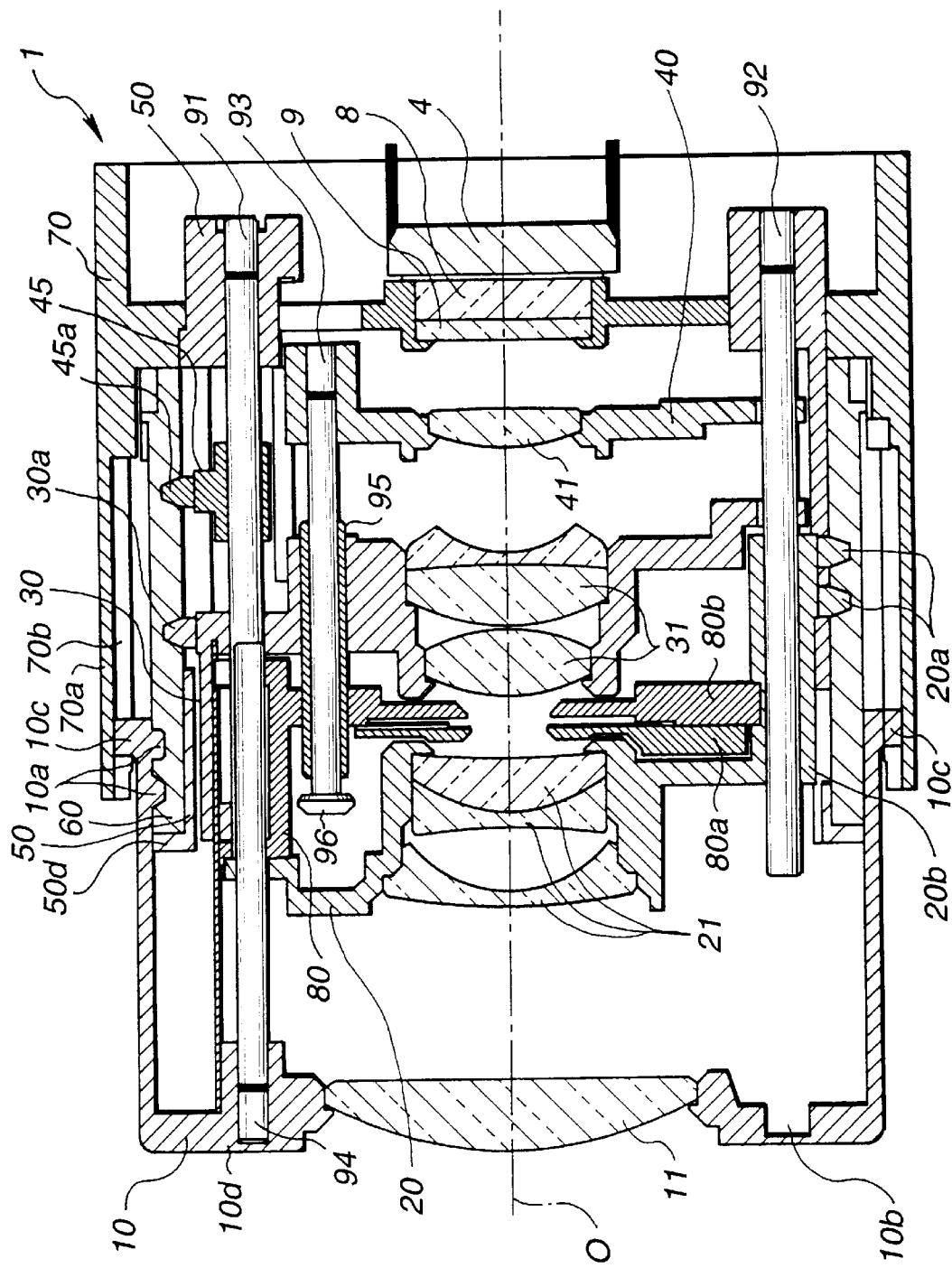
FIG. 3 is a longitudinal sectional view showing the major component members of the lens barrel shown in FIG. 1, wherein the lens barrel is set to a telephoto state and located at the photographic position.

A lens barrel 1 in accordance with the first embodiment of the present invention is a photographic lens-collapsible zoom lens barrel to be employed in an electronic still camera or the like.

The lens barrel 1 comprises a plurality of groups of photographic lenses and a plurality of frame members as shown in FIG. 1 to FIG. 9. The plurality of groups of photographic lenses (first group of lenses to fourth group of lenses 11, 21, 31, and 41) form an object image. The plurality of frame members include a plurality of lens frames (first to fourth lens frames 10, 20, 30, and 40), a locking frame 50, a fourth group auxiliary frame 45, a shutter and diaphragm unit holding frame 80, and a mounting frame 70. The plurality of lens frames holds the plurality of groups of photographic lenses respectively. The cam frame 60 serves as a moving mechanism for moving the first to fourth lens frames 10, 20, 30 and 40 by a predetermined magnitude along an optical axis O. The locking frame 50 holds the cam frame 60. The fourth group auxiliary frame 45 accommodates an AF motor (not shown in FIG. 1 to FIG. 4) (See FIG. 7). The shutter and diaphragm unit holding frame (hereinafter S frame) 80 serves as a second moving frame for holding a light level adjustment unit. The mounting frame 70 helps mount the lens barrel 1 on a camera body (not shown), supports the locking frame 50, and accommodates an imaging device 4 such as a CCD.

Herein, the first to fourth lens frames 10, 20, 30, and 40, and the fourth group auxiliary frame 45 are moving frames that move along the optical axis. The first to fourth lens frames 10, 20, 30, and 40 are lens frames, and the fourth group auxiliary frame 45 is an auxiliary frame.

The light level adjustment unit mechanically controls an amount of light transmitted by a photographic optical system incorporated in the lens barrel 1. The light level adjustment unit is composed of, for example, a shutter mechanism 80a and a diaphragm mechanism 80b.

Figure 4:
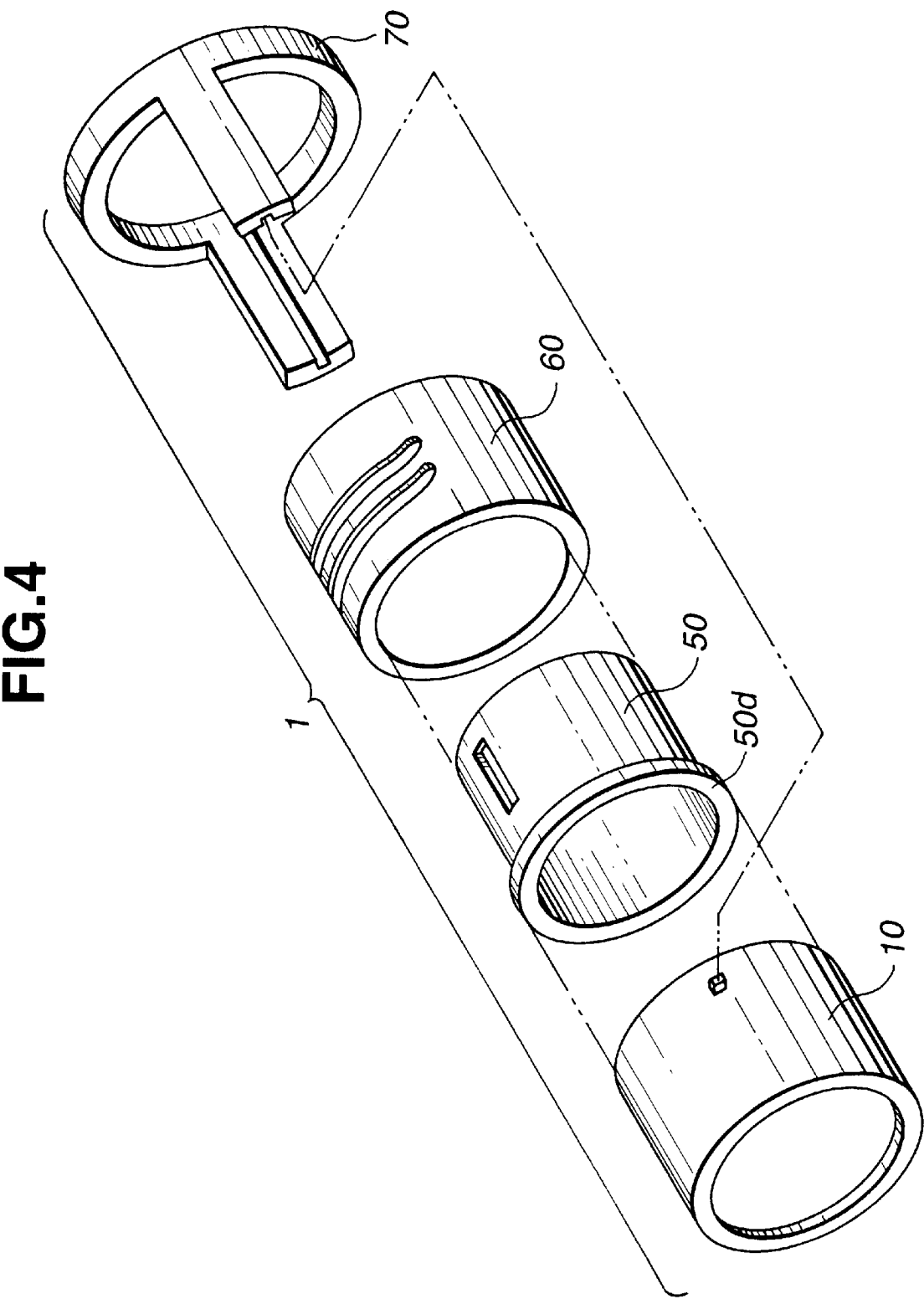
FIG. 4 is an exploded oblique view schematically showing the major members of the lens barrel shown in FIG. 1.

The layout of the major frame members constituting the lens barrel 1 will be explained briefly. As shown in FIG. 4, the locking frame 50 and cam frame 60 are fitted in the first lens frame 10 located in the distal part of the lens barrel. In this case, the inner circumference of the cam frame 60 comes into contact with the outer circumference of the locking frame 50. The second to fourth lens frames 20, 30, and 40, the S frame 80, and the fourth group auxiliary frame 45 (not shown in FIG. 4) are placed in the locking frame 50. The mounting frame 70 is mounted on the face of a camera body and supporting the first lens frame 10 from the outer circumference thereof.

A photographic optical system in the lens barrel 1 of this embodiment is, as mentioned above, composed of a plurality of groups of photographic lenses (four groups). The groups of photographic lenses are arranged from the side of an object in ascending numerical order. Namely, the first group of lenses 11, second group of lenses 21, third group of lenses 31, and fourth group of lenses 41 are arranged in that order. The first to fourth groups of lenses 11, 21, 31, and 41 are held by the first lens frame 10, second lens frame 20, third lens frame 30, and fourth lens frame 40 respectively.

Figure 5:
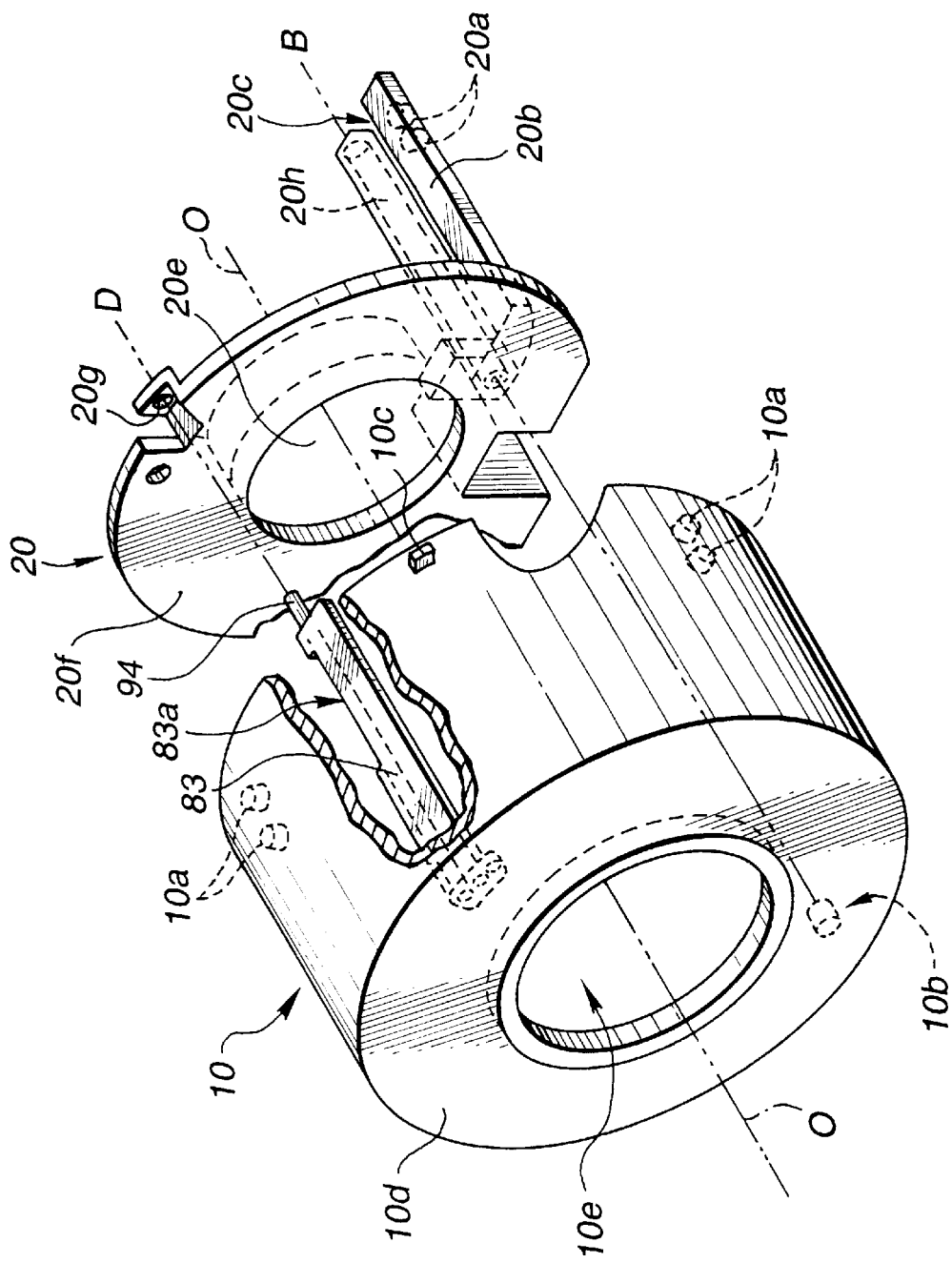
FIG. 5 is a perspective view showing the major component members (first and second lens frames) of the lens barrel shown in FIG. 1.

The first lens frame 10 is, as shown in FIG. 5, formed with a substantially cylindrical member. A holding portion 10d having an opening 10e, through which the first group of lenses 11 is mounted, bored substantially in the center thereof is provided as the distal part of the first lens frame 10.

Figure 6:
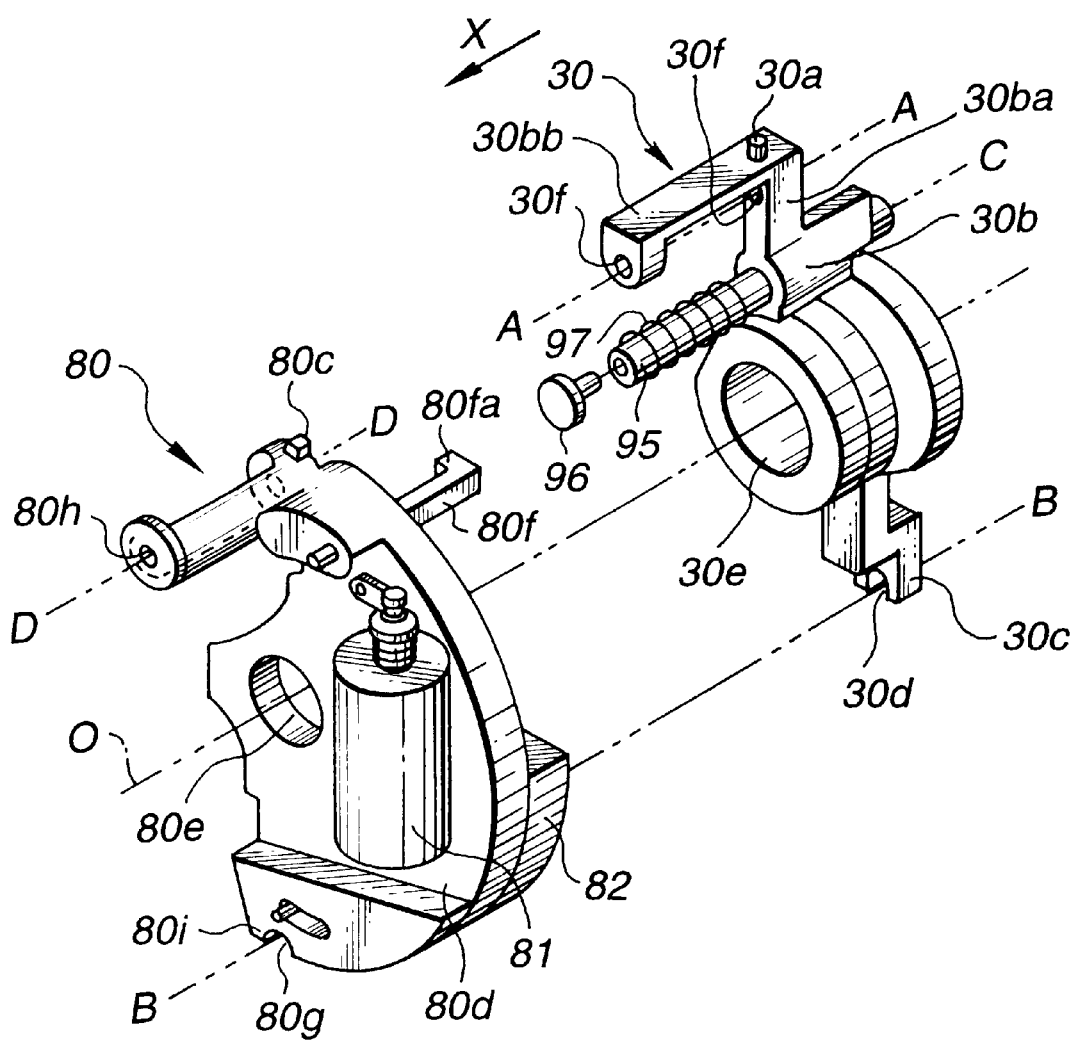
FIG. 6 is an oblique view showing the major component members (S frame and third lens frame) of the lens barrel shown in FIG. 1.
Figure 7:
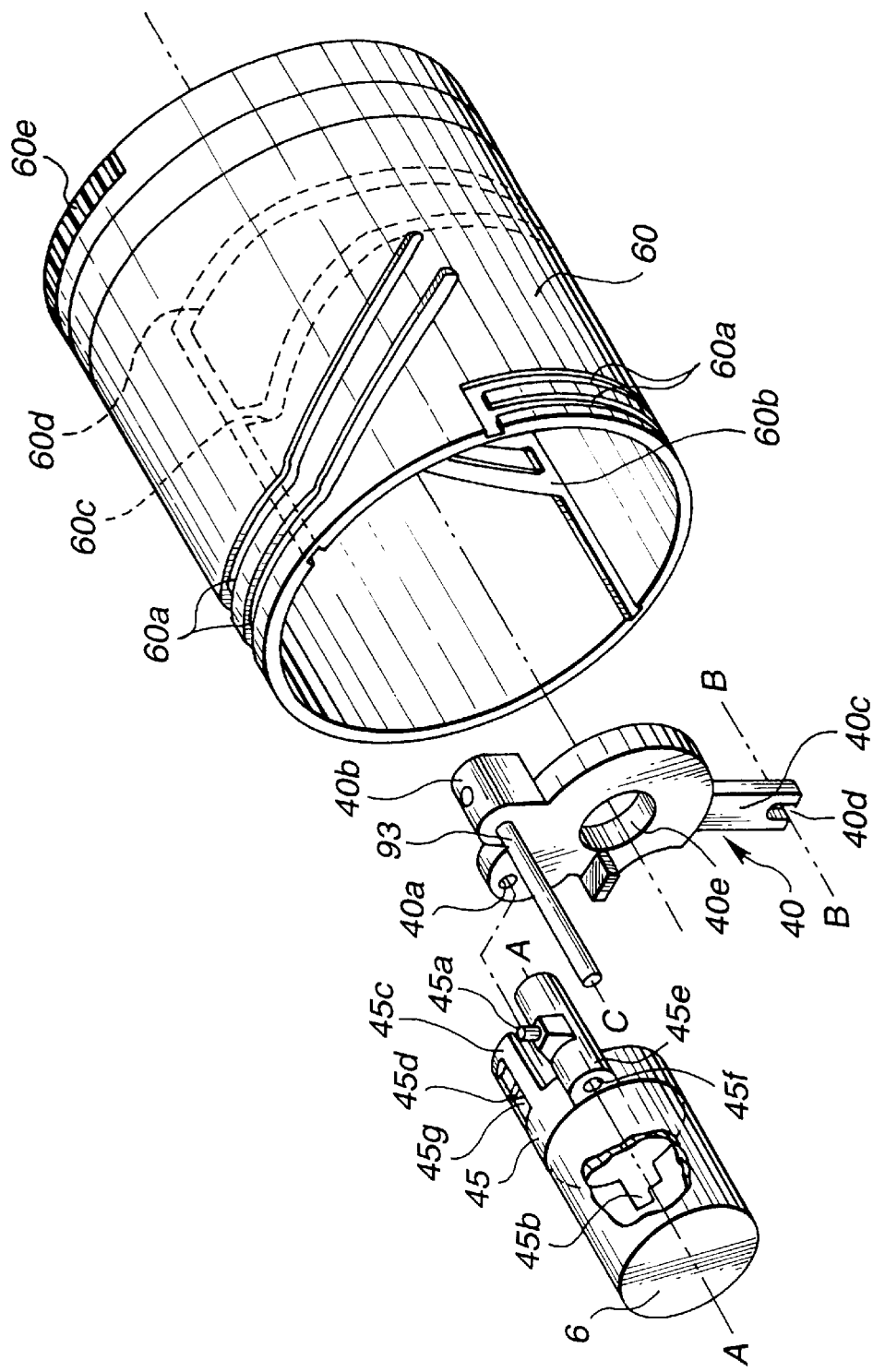
FIG. 7 is an oblique view showing the major component members (fourth auxiliary frame, fourth lens frame, and cam frame) of the lens barrel shown in FIG. 1.
Figure 8:
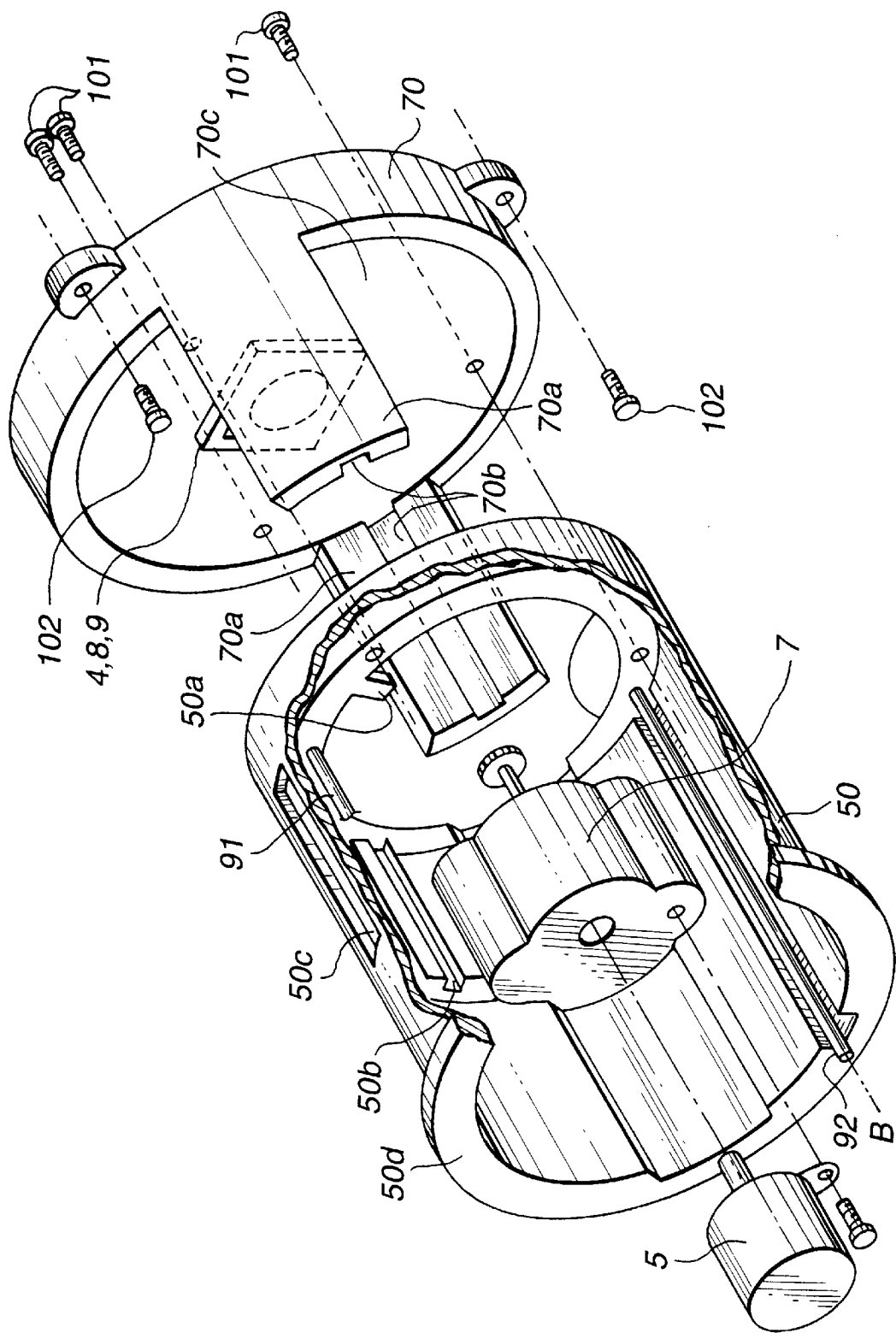
FIG. 8 is an oblique view showing the major component members (locking frame and mounting frame) of the lens barrel shown in FIG. 1.

In FIG. 5 to FIG. 8, the plurality of groups of photographic lenses constituting a photographic optical system is not illustrated for avoiding complication of the drawings. Incidentally, FIG. 5, FIG. 7, and FIG. 8 are cutaways.

Key members 10c that are two guide members are projecting outward at substantially 180° separated positions on the outer circumference of the first lens frame 10 near the back end thereof. The two key members 10c are engaged with key grooves 70b, which are guide grooves, cut in the inner surfaces of arm portions 70a of the mounting frame 70 (See FIG. 8, also) that are two extensions. The turning of the first lens frame 10 is thus restricted. The arm portions 70a are so-called cantilevers and have predetermined elasticity.

On the other hand, first cam pins 10a that are three pairs of cam engagement members are projecting inward at substantially 120° separated positions on the inner circumference of the first lens frame 10 near the back end thereof. The three pairs of first cam pins 10a are engaged with first cam grooves 60a cut in the outer circumference of the cam frame 60 (See FIG. 7, too). When the cam frame 60 turns, the first lens frame 10 moves by a predetermined magnitude along the optical axis alone.

On the other hand, an S frame suspender 83 and a fourth guide shaft 94 are implanted parallel to the optical axis in the holding portion 10d of the first lens frame 10 so that they will face backward. The S frame suspender 83 serves as an interlocking means for interlocking the S frame 80 with the first lens frame 10 and moving the S frame 80 inward along the optical axis. The fourth guide shaft 94 supports the S frame 80 so that the S frame 80 can slide freely along the optical axis.

A notch 83a is formed in the middle of the S frame suspender 83. A jut 80c of the S frame 80 (See FIG. 6, too) is engaged with the notch 83a. The fourth guide shaft 94 is fitted in a through hole 80h of the S frame 80 via an engagement support hole 20g bored in the outer circumference of the second lens frame 20 (See FIG. 5).

The fourth guide shaft 94 supports the second lens frame 20 and S frame 80 so that they can slide freely along the optical axis. The fourth guide shaft 94 also serves as a restricting means for restricting the turning of the frames 20 and 80. In FIG. 5 and FIG. 6, an alternate long and two short dashes line D indicates a path along which the fourth guide shaft 94 is inserted.

Furthermore, a hole 10b is bored in the inner surface of the holding portion 10d of the first lens frame 10. The hole 10b is intended to evacuate one end of a second guide shaft 92 the other end of which is implanted in the inner surface of the back end of the locking frame 50 (See FIG. 8, too). In FIG. 5 to FIG. 8, an alternate long and two short dashes line B indicates a path along which the second guide shaft 92 is inserted.

The second lens frame 20 is, as shown in FIG. 5, a third moving frame made by uniting an arm portion 20b extending backward in parallel with the optical axis with a disk member 20f. An opening 20e through which the second group of lenses 21 is mounted is bored substantially in the center of the disk member 20f.

The second lens frame 20 is located inside the back end of the first lens frame 10. As mentioned above, the fourth guide shaft 94 is inserted into the engagement support hole 20g. Consequently, the turning of the second lens frame 20 is restricted. Besides, the second lens frame 20 is supported so that it can slide freely along the optical axis.

Moreover, a through hole 20h is bored in the arm portion 20b of the second lens frame 20. The second guide shaft 92 is inserted into the through hole 20h.

A pair of second cam pins 20a projects from the outer surface of the arm portion 20b. The pair of second cam pins 20a is engaged with second can grooves 60b cut in the inner circumference of the cam frame 60 (See FIG. 7). The turning of the second lens frame 20 is restricted by the second and fourth guide shafts 92 and 94. When the cam frame 60 turns, the second lens frame 20 is moved by a predetermined magnitude along the optical axis.

Furthermore, a groove 20c is cut in the inner surface of the arm portion 20b. A rotation stopper 80i of the S frame 80 (See FIG. 6) is engaged with the groove 20c. The turning of the S frame 80 is thus restricted. Specifically, the groove 20c of the second lens frame 20 and the rotation stopper 80i of the S frame 80 constitute a direction-of-movement restricting means for restricting the movement of the S frame 80.

The S frame 80 is located behind the second lens frame 20. The S frame 80 is, as shown in FIG. 6, a second moving frame realized with a substantially semi circular plate member 80d. A shutter mechanism 80a, a diaphragm mechanism 80b (not shown in FIG. 6) (See FIG. 1 to FIG. 3), a shutter plunger 81, and a diaphragm plunger 82 (not shown in FIG. 1 to FIG. 3) (See FIG. 6) are efficiently arranged at positions at which they will not block an opening 80e bored substantially in the center of the plate member. Moreover, a U-shaped groove 80g is cut in the lower part of the outer circumference of the S frame 80. The second guide shaft 92 is engaged with the U-shaped groove 80g.

The rotation stopper 80i is projecting forward near the U-shaped groove 80g. The rotation stopper 80i is, as mentioned above, engaged with the groove 20c of the arm portion 20b of the second lens frame 20.

The jut 80c is, as mentioned above, engaged with the notch 83a of the S frame suspender 83 of the first lens frame 10. The S frame 80 moves along the optical axis responsively to the movement along the optical axis of the first lens frame 10.

Moreover, a timber-like anti-thrust member 80f having a distal part thereof formed like a hook is extending backward parallel to the optical axis from the upper part of the outer circumference of the S frame 80. The anti-thrust member 80f is formed as an integral part of the plate member 80d. The anti-thrust member 80f fills the role of a restricting member for restricting the magnitude of the movement along the optical axis of the S frame 80 to a predetermined magnitude. The S frame 80 makes the movement to shift from a collapsed state to a photographic position responsively to the movement of the first lens frame 10.

Specifically, when the S frame being interlocked with the first lens frame 10 moves along the optical axis, the anti-thrust member 80f moves in the same direction. The distal hook-like part 80fa of the anti-thrust member 80f is locked by an S frame stopper 50a projecting from the inner circumference of the back end of the locking frame 50 (See FIG. 8).

The S frame stopper 50a and anti-thrust member 80f fill the role of a position restricting means. Specifically, they restrict the magnitude of the movement in one direction (forward direction of thrust) along the optical axis of the S frame 80, and thus place the S frame 80 at the photographic position. The movements of the first and second lens frames 10 and 20 of the lens barrel 1 and of the S frame 80 thereof will be described later in conjunction with FIG. 13.

The third lens frame 30 is, as shown in FIG. 6, a moving frame made by uniting upper and lower support members 30b and 30c with a substantially cylindrical body member. The body member has a hollow 30e, in which the third group of lenses 31 is mounted, bored substantially in the center thereof. A U-shaped groove 30d having substantially the same diameter as the second guide shaft 92 is cut in the distal part of the lower support member 30c. The second guide shaft 92 is engaged with the U-shaped groove 30d. The second guide shaft 92 thus restricts the turning of the third lens frame 30.

On the other hand, the upper support member 30b of the third lens frame 30 is composed of a supporting portion 30ba and an arm portion 30bb. The supporting portion 30ba is located substantially orthogonally to (above) the optical axis O. The arm portion 30bb is united with the distal part of the supporting portion 30ba and extending forward substantially parallel to the optical axis O. A third cam pin 30a juts outward (upward) from the arm portion 30bb. Moreover, a through hole 30f into which the first guide shaft 91 is inserted and which in turn supports the first guide shaft 91 is bored in the arm portion 30bb. The first guide shaft 91 thus guides the movement along the optical axis of the third lens frame 30. In FIG. 6, an alternate long and two short dashes line A indicates a path along which the first guide shaft 91 is inserted.

A sleeve 95 serving as a bearing means formed with a separate thin cylindrical member is fixed to the proximal part of the arm member 30b. A third guide shaft 93 implanted in the fourth lens frame 40 is inserted into the sleeve 95. The inclusion of the sleeve 95 enables more strict optical positioning of the fourth lens frame 40 relative to the third lens frame 30.

Moreover, a constraining member 97 such as a stretchable coil spring is wound about the sleeve 95. A lid member 96 is attached to one end of the sleeve 95. The constraining means 97 always constrains the fourth lens frame 40 to move in the direction of arrow X in FIG. 6 (this will be detailed later).

The fourth lens frame 40 is, as shown in FIG. 7, a moving frame made by uniting upper and lower support members 40b and 40c with a substantially disk-like plate member. The plate member has an opening 40e, through which the fourth group of lenses 41 is mounted, bored substantially in the center thereof. A U-shaped groove 40d having substantially the same diameter as the second guide shaft 92 is cut in the distal part of the lower support member 40c in the same manner as that in the third lens frame 30. The second guide shaft 92 is engaged with the U-shaped groove 40d. The second guide shaft 92 thus restricts the turning of the fourth lens frame 40.

On the other hand, the third guide shaft 93 is implanted in the upper support member 40b of the fourth lens frame 40 so that the third guide shaft 93 will extend forward substantially parallel to the optical axis O. As mentioned above, the third guide shaft 93 is inserted into the sleeve 95, and thus guides the movement along the optical axis of the fourth lens frame 40. In FIG. 6 and FIG. 7, an alternate long and two short dashes line C indicates a path along which the third guide shaft 93 is inserted.

An escape hole 40a is bored near the third guide shaft 93 implanted in the fourth lens frame 40. An axis of rotation 6a of the AF motor 6 (not shown in FIG. 7) (See FIG. 10 and FIG. 11 to be referred to later) mounted on the fourth group auxiliary frame 45 is inserted into the escape hole 40a with a clearance preserved.

The fourth group auxiliary frame 45 is a moving frame that holds the AF motor 6 for moving the fourth lens frame 40. The fourth group auxiliary frame 45 is located away from the optical axis O so as not to intercept a light beam passing through the lens barrel 1. The axis of rotation 6a of the AF motor 6 (See FIG. 10 and FIG. 11 to be referred to later) is, as mentioned above, extending backward substantially parallel to the optical axis inside the fourth group auxiliary frame 45.

An arm portion 45c and a supporting portion 4e are formed on the outer circumference of the fourth group auxiliary frame 45. A fourth cam pin 45a projects upward from the supporting portion 45e. The fourth cam pin 45a is engaged with the fourth cam groove 60d of the cam frame 60. The supporting portion 45e has a through hole 45f into which the first guide shaft 91 is inserted, and thus supports the first guide shaft 91. The fourth group auxiliary frame 45 is supported by the first guide shaft 91, and moved along the optical axis.

Figure 10:
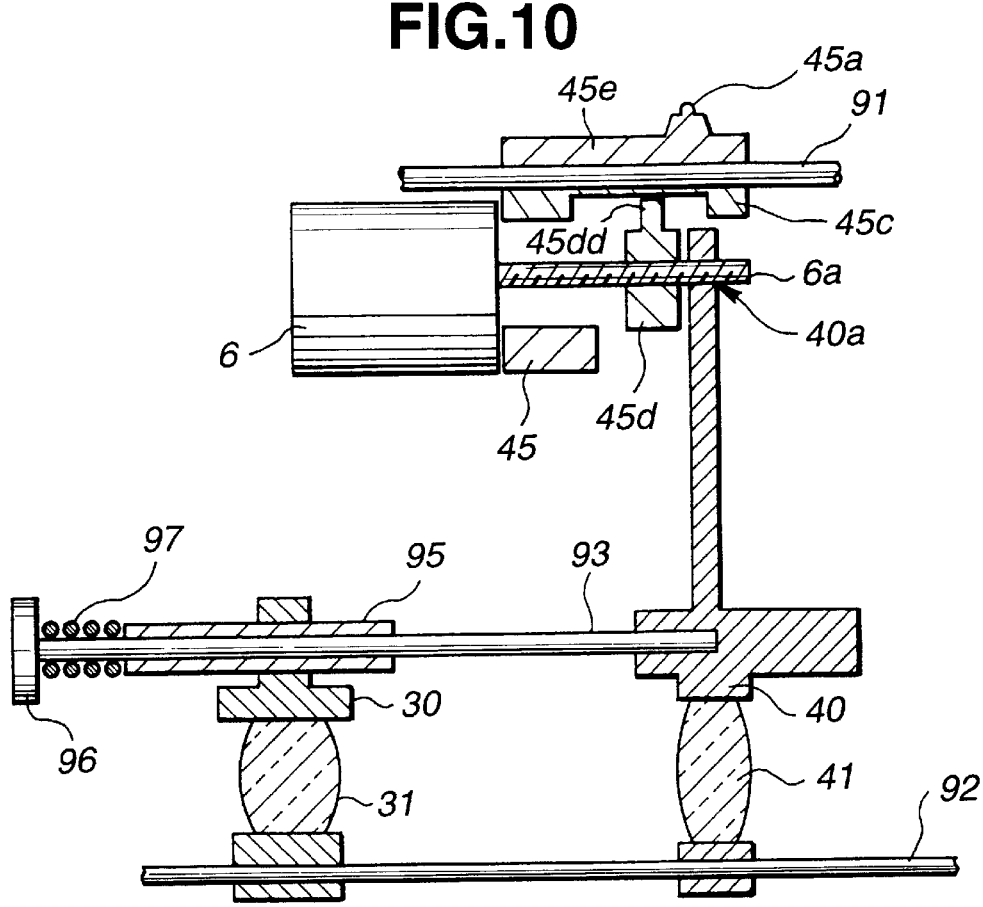
FIG. 10 is a sectional view conceptually showing a state of the lens barrel shown in FIG. 1 in which the fourth auxiliary frame, fourth lens frame, and third lens frame are coupled mutually.

FIG. 10 is a sectional view conceptually showing a state in which the fourth group auxiliary frame 45 and fourth lens frame 40 are coupled to each other, and the fourth lens frame 40 and third lens frame 30 are coupled to each other. FIG. 11 is an enlarged oblique view showing the fourth group auxiliary frame 45 and AF motor alone, wherein the fourth group auxiliary frame 45 is cutaway.

As shown in FIG. 10 and FIG. 11, the arm portion 45c has a through groove 45g bored therein. A jut 45dd of a nut 45d screwed to the axis of rotation 6a of the AF motor 6 is engaged with the through groove 45g. Consequently, when the AF motor 6 rotates, the nut 45d moves along the optical axis. The constraining member 97 constrains the lid member 96 to move towards an object all the time. The fourth lens frame 40 is also constrained to move in the same direction by way of the third guide shaft 93 united with the lid member 96. The outer wall surface of the escape hole 40a meets the surface of the nut 45d. The position of the fourth lens frame 40 is thus restricted. The position of the fourth lens frame 40 is determined due to the nut 45d depending on the position of the AF motor. Consequently, when the AF motor 6 is driven to rotate, the fourth lens frame 40 moves. Predetermined movements are then made to bring the photographic lenses into focus. Moreover, when the cam frame 60 is turned, the fourth lens frame 40 moves along the optical axis due to the guide pin 45a of the fourth group auxiliary frame 45.

On the other hand, a guide convex part 45b is, as shown in FIG. 7, projecting from the outer circumference of the fourth group auxiliary frame 45. The guide convex part 45b is engaged with a guide concave part 50b. The guide concave part 50b extending parallel to the optical axis is formed in the inner surface of the locking frame 50. The turning of the guide convex part 45b is thus restricted.

The cam frame 60 is, as shown in FIG. 7, is realized with a substantially cylindrical member, and serves as a moving mechanism for causing the moving frames to make predetermined movements. Cam grooves 60a, 60b, 60c, and 60d each having a predetermined contour and including a predetermined number of grooves are cut in the inner and outer circumferences of the cam frame 60. The cam grooves are designed to cause the lens frames 10 to 40 to move along the optical axis by predetermined magnitudes.

Moreover, a gear portion 60e that is a gear means is formed on the outer circumference of the back margin of the cam frame 60. A cam frame driving means (See FIG. 8 and FIG. 9) composed of a driving means 5 such as a zoom motor and a driving force conveying unit 7 is coupled to the gear portion 60e.

Figure 9:
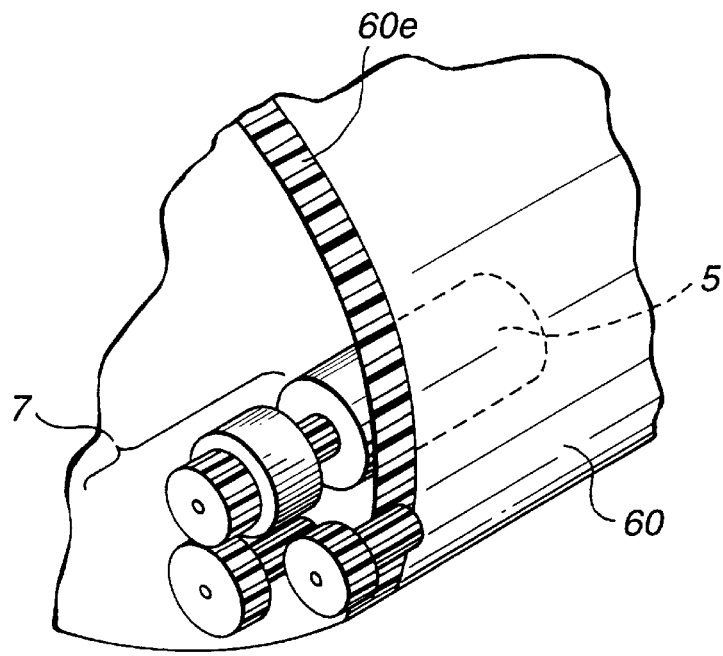
FIG. 9 is an enlarged perspective view showing a major component member (cam frame driving means) of the lens barrel shown in FIG. 1.

As shown in the enlarged oblique view of FIG. 9, the cam frame driving means is composed of the driving force conveying unit 7, which is made up of a plurality of gears and a planetary gear mechanism, and the zoom motor (driving means) 5. A driving force output with the rotation of the axis of output of the zoom motor 5 is conveyed to the gear portion 60e of the cam frame 60 via the driving force conveying unit 7. The cam frame 60 is thus turned. The layout of the cam grooves 60a, 60b, 60c, and 60d has no direction relationship to the present invention. The details will therefore be omitted.

The locking frame 50 is, as shown in FIG. 8, a frame member (See FIG. 4, too) shaped substantially like a cylinder having a flange 50d at the distal end thereof. The frame member or locking frame 50 is placed inside the cam frame 60. The locking frame 50 holds the cam frame 60 and fills the role of restricting the movement along the optical axis of the cam frame 60.

Specifically, the cam frame 60 is clamped by the flange 50d of the locking frame 50 locking the distal end of the cam frame 60 and a disk-like portion 70c of the mounting frame 70 locking the back end thereof. The cam frame 60 is thus fixed to and supported by the locking frame 50 and mounting frame 70.

The cam frame driving means (See FIG. 9) is placed inside the locking frame 50 at a position away from the optical axis O. The cam frame driving means is, as mentioned above, composed of the zoom motor 5 and the driving force conveying unit 7 including a planetary gear train. The zoom motor 5 serves as a driving source for generating a driving force with which predetermined movements are made for varying the power (zooming) within the lens barrel 1 by turning the cam frame 60.

Moreover, ends of the first and second guide shafts 91 and 92 are implanted in the back end of the locking frame 50 so that the first and second guide shafts face forward. Moreover, the mounting frame 70 is fixed to the back end of the locking frame by means of a fastening means 101 such as fixing screws.

An elongated through hole 50c is bored in the flank of the locking frame 50. The third cam pin 30a and fourth cam pin 45a formed on the third lens frame 30 and fourth lens frame 40 respectively penetrate through the through hole 50c. The third lens frame 30 and fourth lens frame 40 are placed inside the locking frame 50. A through hole having substantially the same shape as the through hole 50c is bored at an opposite position 180° separated from the through hole 50c, though the through hole is not shown. The second cam pin 20a penetrates through the through hole.

The mounting frame 70 is made by uniting two arm portions 70a with a disk-like portion 70c having an opening substantially in the center thereof. The mounting frame 70 serves as a coupling means for coupling the lens barrel 1 of this embodiment to a camera or the like (not shown). In other words, the mounting frame 70 is mounted on and fixed to a frame (not shown) in a camera or the like by means of a fastening means 102 such as a fixing screw or the like.

As mentioned above, the arm portions 70a of the mounting frame 70 support the first lens frame 10 so that the first lens frame 10 can slide freely along the optical axis. The arm portions 70a also fill the role of restricting the turning of the first lens frame.

An infrared (IR) cut filter 9, a low-pass filter (LPF) 8, and an imaging device 4 are placed in that order from an object substantially in the center of the mounting frame 70. They are arranged to become orthogonal to the optical axis O of the photographic optical system. The IR cut filter 9 removes an infrared component from a light beam returned from the object and transmitted by the photographic optical system. The low-pass filter 8 removes a high-frequency component from the light beam returned from the object and transmitted by the IR cut filter 9. The imaging device 4 such as a CCD converts the light beam, which is transmitted by the photographic optical system and forms an object image (hereinafter an object light beam), into an electric signal.

Owing to the foregoing components, the six moving frames, that is, the first to fourth lens frames 10, 20, 30, and 40, the S frame 80, and the fourth group auxiliary frame 45 are moved with a driving force exerted by the zoom motor 5 via the cam frame 60 serving as a moving mechanism. Furthermore, the fourth lens frame 40 is moved by the AF motor 6 mounted in the fourth group auxiliary frame 45. The moving frames are moved along the optical axis by predetermined magnitudes and retained at predetermined positions.

The movements of the moving frames of the lens barrel 1 having the foregoing components will be described in conjunction with FIG. 12.

FIG. 12 conceptually shows the positional relationships of the moving frames attained when the lens barrel of this embodiment is set to respective states. FIG. 12A shows a collapsed state in which the moving frames are located at stowed positions that are non-photographic positions. FIG. 12B shows a state (wide-angle state) in which the moving frames are located at short-focus (wide-angle) positions that are photographic positions. FIG. 12C shows a state (telephoto state) in which the moving frames are located at long-focus (or telephoto) positions that are photographic positions.

To begin with, assume that the lens barrel is set to the collapsed state (stowed non-photographic position) shown in FIG. 12A. The main power supply of a camera on which the lens barrel 1 is mounted is turned on, and the camera is set to a photographic mode. Responsively, the zoom motor 5 is driven and the cam frame 60 makes a predetermined turn. This causes the moving frames to lie at the predetermined photographic (short-focus) positions shown in FIG. 12B. In this case, the first lens frame 10, second lens frame 20, and S frame 80 move along the optical axis towards an object. However, the third lens frame 30, fourth lens frame 40, and fourth group auxiliary frame 45 are not moved.

When the moving frames are located at the photographic positions shown in FIG. 12B, the power of the lenses may be varied (zooming). In this case, the moving frames move along the optical axis between the short-focus positions shown in FIG. 12B and the long-focus positions shown in FIG. 12C. However, when the power is varied, the first lens frame 10 and S frame 80 do not move. Moreover, the second lens frame 20, third lens frame 30, fourth lens frame 40, and fourth group auxiliary frame 45 move along the optical axis. Above all, the second lens frame 20 and third lens frame 30 make predetermined movements to enable zooming. The fourth lens frame 40 and fourth group auxiliary frame 45 make predetermined movements to enable focusing. In other words, when the moving frames lie in a zone including the positions shown in FIG. 12B and the positions shown in FIG. 12C, the fourth lens frame 40 and fourth group auxiliary frame 45 move to enable an operation different from an operation involving the other moving frames. Specifically, the fourth lens frame 40 and fourth group auxiliary frame 45 are involved in an operation of adjusting the focus of the whole photographic optical system.

Assume that the moving frames lie in a photographic zone including the positions shown in FIG. 12B and the positions shown in FIG. 12C. At this time, the main power supply of the camera may be turned off in order to terminate photography. In this case, the groups of photographic lenses move to the stowed positions shown in FIG. 12A via the short-focus positions shown in FIG. 12B. This causes the lens barrel to enter the collapsed state.

As mentioned above, the groups of photographic lenses make predetermined movements owing to the operation of the cam frame 60.

Next, the movements of the first and second lens frames 10 and 20 of the lens barrel 1, and the S frame 80 thereof will be described in conjunction with FIG. 13.

Figure 13A:
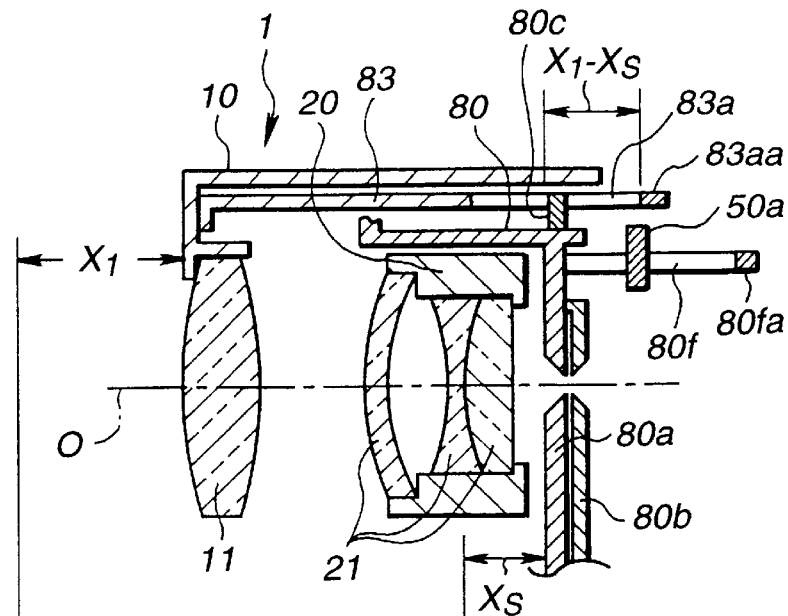
FIG. 13A and FIG. 13B are sectional views schematically showing the movements of the first and second lens frames and the S frame included in the major portion of the lens barrel shown in FIG. 1.
Figure 13B:
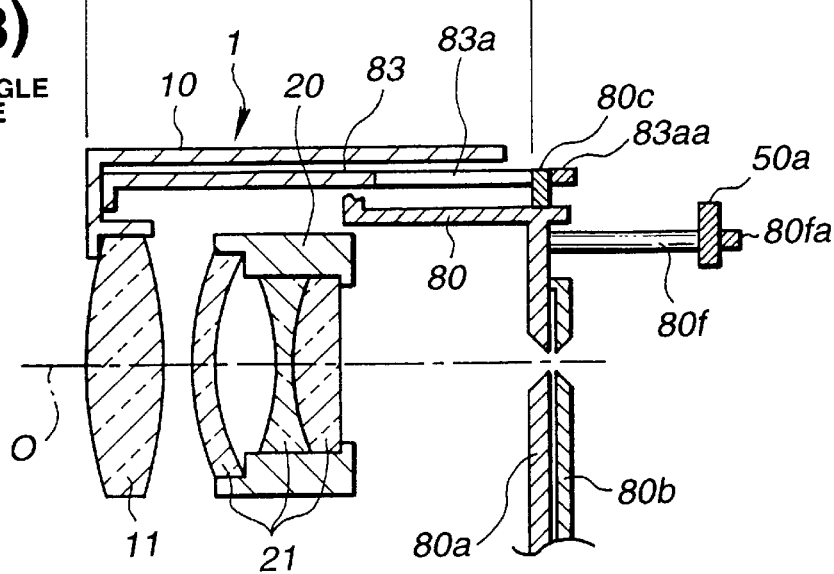

FIG. 13A and FIG. 13B are sectional views schematically showing the movements of the first and second lens frames 10 and 20 and the S frame 80 included in the major portion of the lens barrel of this embodiment. FIG. 13A shows a collapsed state in which the moving frames of the lens barrel 1 lie at stowed positions that are non-photographic positions. FIG. 13B shows a state (wide-angle state) in which the photographic optical system lies at a short-focus (wide-angle) position that is a photographic position.

Assume that the lens barrel 1 changes its state from the collapsed state (non-photographic position) shown in FIG. 13A to the wide-angle state (photographic position) shown in FIG. 13. To begin with, the first and second lens frames 10 and 20 are thrust forward mutually independently owing to the operation of the cam frame 60 (not shown in FIG. 13A and 13B). At this time, the S frame suspender 83 formed inside the first lens frame 10 moves in the same direction.

Specifically, the jut 80c of the S frame 80 is, as mentioned above, engaged with the notch 83a of the S frame suspender 83. When the S frame suspender 83 moves forward or in one direction along the optical axis, the jut 80c abuts on a back end abutment 83aa located at the back end of the notch 83a. This causes the S frame 80 to move in the same direction by a predetermined magnitude while being interlocked with the first lens frame 10.

The distal hook-like part 80fa of the anti-thrust member 80f of the S frame 80 is locked by the S frame stopper 50a of the locking frame 50 (not shown in FIG. 13). The S frame 80 is then placed at a predetermined position (See FIG. 13B).

The magnitude of a movement made by the first lens frame 10 from the instant the lens barrel 1 lies in the collapsed state to the instant it enters the wide-angle state is a distance X1. The predetermined magnitude of a movement made by the S frame 80 (distance Xs) is smaller than the magnitude of a movement, X1, made by the first lens frame 10.

The S frame 80 does not move during a period from the instant the first lens frame 10 starts moving to the instant the back end abutment 83aa of the S frame suspender 83 abuts on the jut 80c of the S frame 80 (distance X1–Xs). This range is a range of non-interlocking in which the S frame 80 is not interlocked with the first lens frame 10.

Next, the abutment 83aa abuts on the jut 80c. The S frame 80 is interlocked with the first lens frame 10 and moved to a predetermined wide-angle position. This range of movement is a range of interlocking. The range of non-interlocking is designated as part of the range defined with the magnitude of a movement, X1, made by the first lens frame 10. A difference between the magnitude of a movement X1 and the magnitude of a movement Xs is thus absorbed.

On the other hand, assume that the lens barrel 1 changes its state from the wide-angle state (photographic positions) shown in FIG. 13B to the collapsed state (non-photographic positions) shown in FIG. 13A. In this case, the first and second lens frames 10 and 20 are plunged backward mutually independently owing to the operation of the cam frame 60. The back end of the second lens frame 20 presses the front end of the S frame 80. The S frame 80 is pushed backward. Consequently, the S frame 80 is placed at a predetermined position with the lens barrel collapsed. Since the cam frame 60 stops driving, the first and second lens frames 10 and 20 are placed at predetermined positions with the lens barrel collapsed.

As mentioned above, according to the first embodiment, even when the movable range of the S frame 80 is set to be smaller than that of the lens frame 10, the range of non-interlocking is designated. The range of non-interlocking is a range within which the S frame 80 will not be interlocked with the first lens frame 10. This obviates the necessity of a dedicated moving mechanism for moving the S frame 80 by a predetermined magnitude. Consequently, the lens barrel 1 itself can be designed compactly and the cost of manufacturing can be reduced.

Moreover, when the first lens frame 10 moves from the non-photographic position to the photographic position, the S frame 80 moves in the same direction while being interlocked with the first lens frame 10. When the first lens frame 10 moves from the photographic position to the non-photographic position, the S frame 80 is moved by the second lens frame 20. This obviates the necessity of a dedicated moving mechanism for moving the S frame 80 by a predetermined magnitude. The S frame 80 can be placed precisely at least at the photographic position. Consequently, the number of component members of the lens barrel 1 can be decreased. Eventually, the lens barrel 1 itself can be designed compactly and the cost of manufacturing can be reduced.

When the S frame 80 moves from the photographic position to the non-photographic position, the movement of the S frame is restricted by an interlocking means (S frame suspender 83). When the S frame 80 moves from the non-photographic position to the photographic position, the movement of the S frame 80 is restricted by the position restricting means (S frame stopper 50a and anti-thrust member 80f). The S frame 80 can therefore be retained exactly at the predetermined photographic position relative to the optical axis. The light level adjustment unit including the shutter mechanism 80a and diaphragm mechanism 80b can be positioned optically optimally. Consequently, deterioration in quality of a projected image can be suppressed, and a brighter image can be produced readily.

On the other hand, the inner circumference of the cam frame 60 is brought into contact with the outer circumference of the locking frame 50. Even when the thickness of the cam frame 60 is small, required rigidity can be attained. The problem will be solved that the cam frame 60 is deformed due to an extraneous force applied to the lens barrel 1 or a force applied when the first lens frame 10 moves. Moreover, since required rigidity can be attained, the moving frames can be placed precisely at the positions determined by the cam frame 60.

Moreover, the first lens frame 10 is supported by the arm portions 70a of the mounting frame 70 so that the first lens frame can slide freely along the optical axis due to the guide (key) grooves 7. Errors of the dimensions of the component members can therefore be absorbed due to the elasticity of the arm portions 70a. Consequently, predetermined precision can be ensured for machining.

The zoom motor 5 is incorporated in the locking frame 50. The overall length of the lens barrel 1 can therefore be decreased readily. Eventually, components can be mounted efficiently in a camera in which the lens barrel 1 is employed.

Furthermore, the gear portion 60e is formed on the outer circumference of the cam frame 60. The structure of dies used to mold the cam frame 60 is therefore simplified. Consequently, the cost of manufacturing can be reduced.

Moreover, a moving frame accommodating no group of photographic lenses, for example, the fourth group auxiliary frame 45 accommodating the AF motor 6 is placed at a position away from the optical axis O. This is intended to prevent interception of a light beam passing through the locking frame 50. The interior of the locking frame 50 can therefore be utilized efficiently. Consequently, the lens barrel 1 can be designed compactly.

Next, a lens barrel in accordance with the second embodiment of the present invention will be described below.

Figure 14:
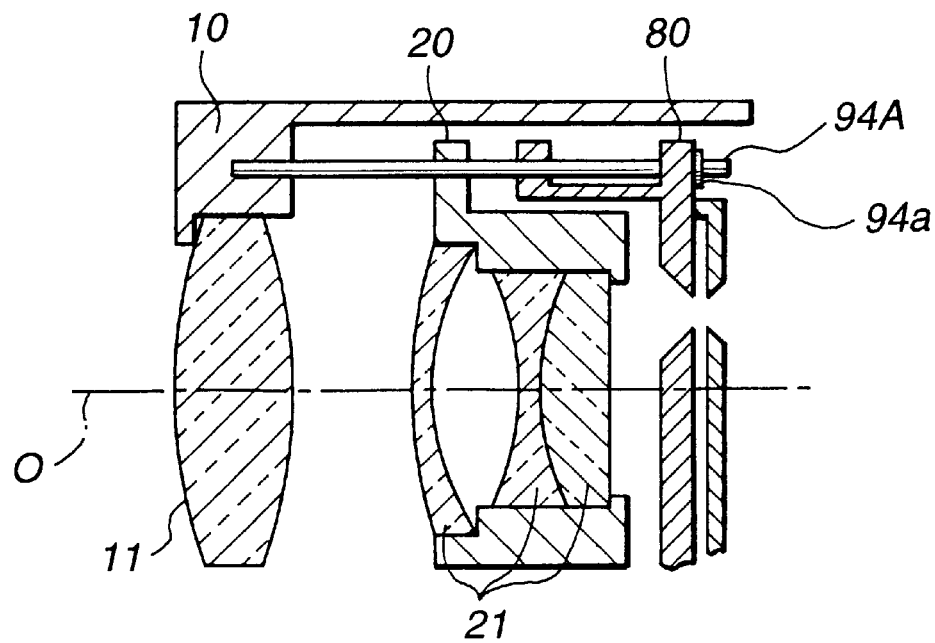
FIG. 14 is a sectional view schematically showing the movements of first and second lens frames and an S frame included in the major portion of a lens barrel in accordance with the second embodiment of the present invention.

FIG. 14 is a sectional view schematically showing the movements of first and second lens frames and an S frame included in the major portion of the lens barrel in accordance with the second embodiment of the present invention. The second embodiment has fundamentally substantially the same components as the first embodiment. A difference lies in the structure of the interlocking means. The details of the component members identical to those of the first embodiment will be omitted. Only different members will be described.

In the first embodiment, the S frame suspender 83 (interlocking means) and fourth guide shaft 94 (restricting means) are, as mentioned above, incorporated in the first lens frame 10 that is a first moving frame. The shutter and diaphragm unit holding frame (S frame) 80 that is a second moving frame is interlocked with the first lens frame 10 by means of the S frame suspender 83. The S frame 80 is thus moved along the optical axis. Moreover, the S frame 80 is supported by the fourth guide shaft 94 so that it can slide freely along the optical axis. The turning of the S frame 80 is thus restricted (See FIG. 13).

In this embodiment, the S frame suspender 83 serving as the interlocking means is excluded. A fourth guide shaft 94A that is a restricting means (See FIG. 14) also serves as an interlocking means.

Specifically, the fourth guide shaft 94a in this embodiment is, as shown in FIG. 14, like the fourth guide shaft 94 in the first embodiment, implanted in the supporting portion of the first lens frame 10. The second lens frame 20 and S frame 80 are supported by the shaft 94A so that they can slide freely.

On the other hand, a stopper member 94a such as an E ring is attached to the back end of the shaft 94A. The stopper member 94a is attached to the shaft 94A that is penetrating through the through hole 80h bored in the S frame 80.

When the first lens frame 10 is thrust forward along the optical axis, the fourth guide shaft 94A interlocked with the first lens frame 10 moves in the same direction. At this time, the S frame 80 moves in the same direction owing to the stopper member 94a attached to the fourth guide shaft 94A. Herein, a restricting means restricts the backward movement of the S frame 80 that is made after the S frame has moved to the predetermined position. The restricting means is, similarly to that in the first embodiment, realized with an anti-thrust member 80fa and the S frame stopper 50a that locks the anti-thrust member 80fa (not shown in FIG. 14).

On the other hand, when the first lens frame 10 is plunged backward along the optical axis, the S frame 80 will not be interlocked with the first lens frame 10 but will remain intact. However, the second lens frame 20 abuts the S frame 80, and the S frame 80 is pushed back by the second lens frame 20. The S frame 80 thus moves to the predetermined position with the lens barrel collapsed.

Owing to the foregoing structure, this embodiment can provide the same advantages as the first embodiment. Besides, the number of component members can be decreased and the overall structure can be simplified. Consequently, the manufacturing process can be simplified and the cost of manufacturing can be minimized.

Moreover, in the first embodiment, the S frame 80 is interlocked with the first lens frame 10. When the first lens frame 10 moves along the optical axis from the non-photographic position to the photographic position, the distal hook-like part 80fa of the anti-thrust member 80f of the S frame 80 is locked by the S frame stopper 50a of the locking frame 50. This restricts the magnitude of the movement in one direction along the optical axis made by the S frame 80 (forward direction of thrust). Moreover, the S frame 80 is accurately placed at the photographic position. Thus, the position restricting means is realized.

In this case, the back end abutment 83aa of the S frame suspender 83 may be designed to be elastic. The precision in positioning the S frame 80 will further be improved.

Figure 15:
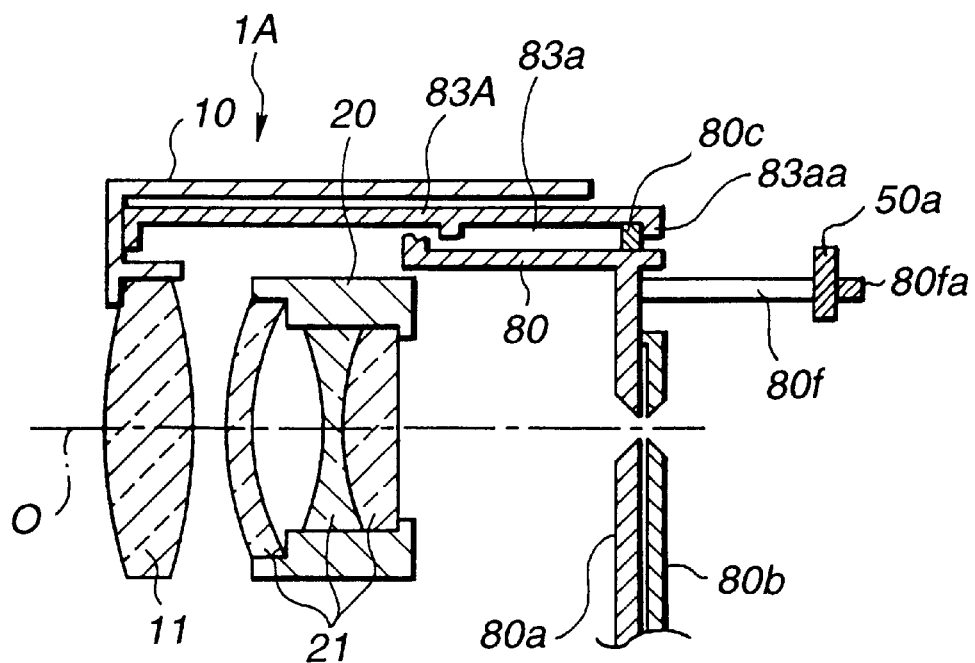
FIG. 15 is a sectional view schematically showing the movements of first and second lens frames and an S frame included in the major portion of a lens barrel in accordance with the third embodiment of the present invention, wherein the frames are about to be placed at the photographic positions.
Figure 16:
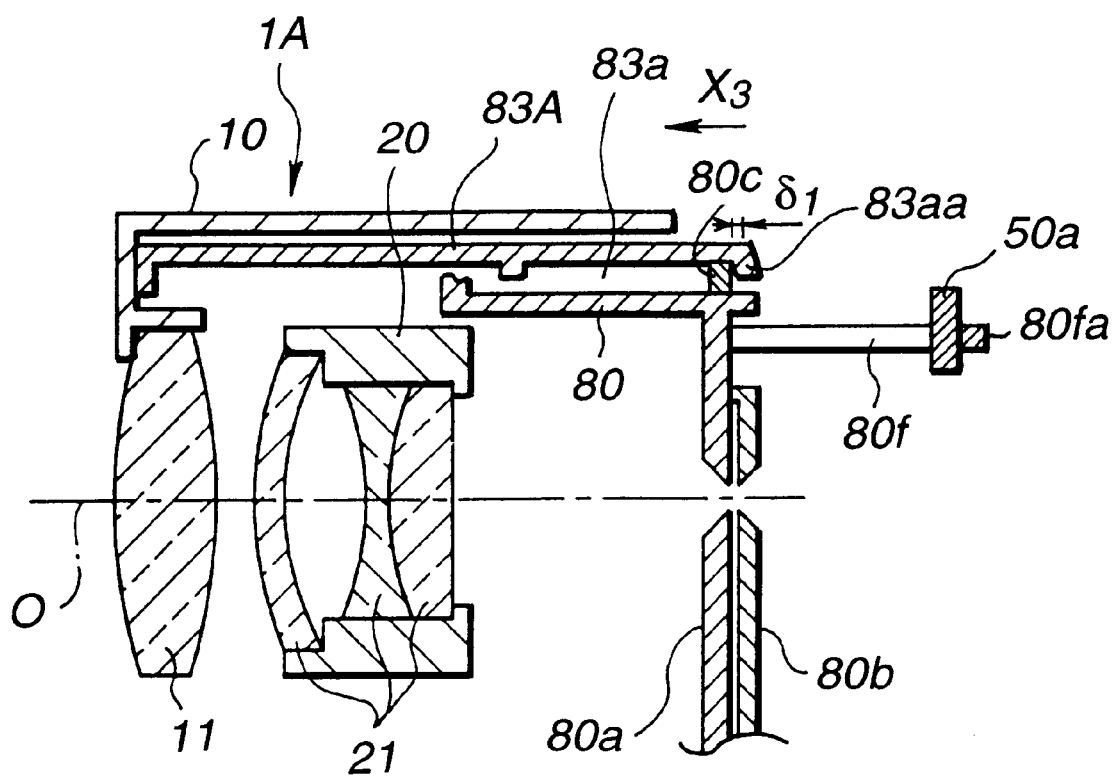
FIG. 16 is a sectional view schematically showing the movements of the first and second lens frames and the S frame included in the major portion of a lens barrel in accordance with the third embodiment of the present invention, wherein the frames have been placed at the photographic positions.

FIG. 15 and FIG. 16 are sectional views schematically showing the movements of first and second lens frames and an S frame included in the major portion of a lens barrel in accordance with the third embodiment of the present invention. FIG. 15 shows a state attained immediately before the lens barrel is placed at the photographic position. FIG. 16 shows a state in which the lens barrel has been placed at the photographic position. Even this embodiment has fundamentally substantially the same components as the first embodiment. A difference lies in that the interlocking means is realized with an elastic member. The details of the component members identical to those of the first embodiment will be omitted.

In the lens barrel 1 of this embodiment, the back end abutment 83aa of the S frame suspender 83A is realized with an elastic member. In this case, the S frame 80 is interlocked with the first lens frame 10. Assume that the S frame 80 moves along the optical axis from the non-photographic position to the photographic position. The same movements as those made in the first embodiment are made until the S frame 80 comes to a position immediately preceding the predetermined photographic position. That is to say, the same movements are made until the distal hook-like part 80fa of the anti-thrust member 80f of the S frame 80 abuts the S frame stopper 50a of the locking frame 50 (state shown in FIG. 15).

Assume that the distal hook-like part 80fa of the anti-thrust member 80f abuts the S frame stopper 50a to be locked by the S frame stopper 50a. A force causing the S frame 80 to move forward may be applied to the S frame. In this case, the back end abutment 83aa of the S frame suspender 83A deforms elastically due to its own elasticity as shown in FIG. 16. The S frame 80 is moved forward by a distance δ1. In this state, the S frame 80 is stopped moving.

A force causing the S frame 80 to move in one direction along the optical axis (forward direction of thrust or direction of arrow X3 in FIG. 16) is applied to the S frame 80 constantly. This is attributable to the elasticity of the back end abutment 83aa of the S frame suspender 83A.

Thus, the S frame 80 can be positioned more strictly precisely.

Incidentally, the back end abutment 83aa of the S frame suspender 83A is realized with an elastic member. Alternatively, the distal hook-like part 80fa of the anti-thrust member 80f may be realized with an elastic member. The same advantages as those mentioned above can still be provided.

As described so far, the present invention can be adapted to moving frames, in which facilities are mounted, other than lens frames holding photographic lenses and requested to be positioned strictly precisely.

In the embodiments, the second moving frame is a shutter and diaphragm unit holding frame in which a shutter and diaphragm unit is mounted. The present invention is not limited to this mode. Alternatively, the present invention may be adapted to a moving frame in which, for example, an AF motor is mounted.

Moreover, the present invention is adapted to a lens barrel designed to assume two different states. In the embodiments, the present invention is adapted to a zoom lens barrel of a collapsible type. The present invention is not limited to this type of lens barrel. Alternatively, the present invention can easily be implemented in a two-focus type lens barrel or a lens barrel designed to be changeable between normal photography and macro zoom photography.

In the present invention, it is apparent that a wide range of different embodiments can be constructed based on the invention without a departure from the spirit and scope of the invention. This invention will be limited by the appended claims but not restricted by any specific embodiments.

What is claimed is:

1. A lens barrel having a plurality of moving frames and a plurality of lenses, comprising:

a first moving frame movable along an optical axis of said lenses;

a second moving frame movable along the optical axis within a range smaller than the movable range of said first moving frame; and an interlocking means, formed on said first moving frame, for causing said second moving frame to move responsively to the movement of said first moving frame along the optical axis, wherein the movable range of said first moving frame falls into a range of interlocking within which said second moving frame is moved interlocked with said first moving frame, and a range of non-interlocking within which said second moving frame is not interlocked with said first moving frame.

2. A lens barrel according to claim 1, further comprising a third moving frame interposed between said first moving frame and said second moving frame and movable along the optical axis, wherein said second moving frame moves responsively only to the movement of said first moving frame in one direction along the optical axis, and the movement of said second moving frame in an opposing direction along the optical axis is caused by said third moving frame.

3. A lens barrel according to claim 1, wherein said first moving frame is a lens frame accommodating part of a photographic optical system, and said second moving frame includes a light level adjustment unit for mechanically controlling an amount of light to be transmitted by the photographic optical system.

4. A lens barrel according to claim 3, wherein: said lens barrel is of a collapsible type and designed to assume at least two states, that is, a state in which said plurality of moving frames is thrust to predetermined photographic positions, and a state in which said plurality of moving frames is stowed at predetermined non-photographic positions within said lens barrel; and said first moving frame moves within a range from a non-photographic position to a photographic position.

5. A lens barrel according to claim 1, wherein said interlocking means also serves as a restricting means for restricting said second moving frame so that only said second moving frame can move along the optical axis.

6. A lens barrel according to claim 2, further comprising a locking frame shaped substantially like a cylinder and supporting said second moving frame therein, and a position restricting means for restricting the movement in one direction along the optical axis of said second moving frame and placing said second moving frame at a predetermined photographic position, wherein said second moving frame is retained at the photographic position by said position restricting means and said interlocking means.

7. A lens barrel according to claim 6, wherein said position restricting means includes a projection formed as an integral part of said locking frame on the inner surface thereof, and a hook-like portion formed as an integral part of said second moving frame and engaged with said projection.

8. A lens barrel according to claim 6, wherein said interlocking means is realized with an elastic member.

9. A lens barrel according to claim 2, wherein said third moving frame is provided with a direction-of-movement restricting means for restricting the direction of movement of said second moving frame so that only said second moving frame can be moved along the optical axis.

10. A lens barrel according to claim 2, wherein said first moving frame is a lens frame accommodating part of a photographic optical system, and said second moving frame includes a light level adjustment unit for mechanically controlling an amount of light to be transmitted by the photographic optical system.

11. A lens barrel according to claim 10, wherein: said lens barrel is of a collapsible type and designed to assume at least two states, that is, a state is which said plurality of moving frames is thrust to predetermined photographic positions, and a state is which said plurality of moving frames is stowed at predetermined non-photographic positions within said lens barrel; and said first moving frame moves within a range from a non-photographic position to a photographic position.

12. A lens barrel according to claim 2, wherein said interlocking means also serves as a restricting means for restricting said second moving frame so that said second moving frame can move along the optical axis alone.

13. A lens barrel according to claim 3, further comprising a locking frame shaped substantially like a cylinder and supporting said second moving frame therein, and a position restricting means for restricting the movement in one direction along the optical axis of said second moving frame and placing said second moving frame at a predetermined photographic position, wherein said second moving frame is retained at the photographic position by said position restricting means and said interlocking means.

14. A lens barrel according to claim 10, further comprising a locking frame shaped substantially like a cylinder and supporting said second moving frame therein, and a position restricting means for restricting the movement in one direction along the optical axis of said second moving frame and placing said second moving frame at a predetermined photographic position, wherein said second moving frame is retained at the photographic position by said position restricting means and said interlocking means.

15. A lens barrel according to claim 4, further comprising a locking frame shaped substantially like a cylinder and supporting said second moving frame therein, and a position restricting means for restricting the movement in one direction along the optical axis of said second moving frame and placing said second moving frame at a predetermined photographic position, wherein said second moving frame is retained at the photographic position by said position restricting means and said interlocking means.

16. A lens barrel according to claim 11, further comprising a locking frame shaped substantially like a cylinder and supporting said second moving frame therein, and a position restricting means for restricting the movement in one direction along the optical axis of said second moving frame and placing said second moving frame at a predetermined photographic position, wherein said second moving frame is retained at the photographic position by said position restricting means and said interlocking means.

17. A lens barrel according to claim 13, wherein said position restricting means includes a projection formed as an integral part of said locking frame on the inner surface thereof, and a hook-like portion formed as an integral part of said second moving frame and engaged with said projection.

18. A lens barrel according to claim 14, wherein said position restricting means includes a projection formed as an integral part of said locking frame on the inner surface thereof, and a hook-like portion formed as an integral part of said second moving frame and engaged with said projection.

19. A lens barrel according to claim 15, wherein said position restricting means includes a projection formed as an integral part of said locking frame on the inner surface thereof, and a hook-like portion formed as an integral part of said second moving frame and engaged with said projection.

20. A lens barrel according to claim 16, wherein said position restricting means includes a projection formed as an integral part of said locking frame on the inner surface thereof, and a hook-like portion formed as an integral part of said second moving frame and engaged with said projection.

21. A lens barrel according to claim 13, wherein said interlocking means is realized with an elastic member.

22. A lens barrel according to claim 14, wherein said interlocking means is realized with an elastic member.

23. A lens barrel according to claim 15, wherein said interlocking means is realized with an elastic member.

24. A lens barrel according to claim 16, wherein said interlocking means is realized with an elastic member.

25. A lens barrel having an optical axis, said lens barrel comprising:
a first lens frame shaped substantially like a cylinder, having cam engagement members formed on the inner surface of the cylinder, and having guide members formed on the outer surface of the cylinder;
a cam frame placed in contact with the inner circumference of said first lens frame, and having cam members, which are engaged with said cam engagement members, formed on the outer circumference thereof;
a locking frame placed in contact with the inner circumference of said cam frame, and having moving frames other than said first lens frame mounted therein; and
a mounting frame having extensions that extend along the optical axis and that each have a guide groove, with which said guide member of said first lens frame is engaged, formed as an integral part thereof on the inner surface thereof, and supporting said locking frame, wherein when said guide members are engaged with said guide grooves in said mounting frame, the turning of said first lens frame is restricted; and when said cam engagement members are engaged with said cam members of said cam frame, only said first lens frame moves along an optical axis.

26. A lens barrel according to claim 25, further comprising: a driving means, held in said locking frame, for driving said cam frame; a gear means, formed as an integral pat of said cam frame on the outer circumference thereof, for driving said cam frame; and a driving force conveying means, composed of a plurality of gears, for conveying a rotation driving force exerted on an axis of output of said driving means to said gear means.

27. A lens barrel having a plurality of lenses, said lens barrel comprising:

a lens frame movable along an optical axis of said lenses and accommodating said lenses;

an auxiliary frame movable along the optical axis and accommodating no lens; and a locking frame shaped substantially like a cylinder and having said lens frame and auxiliary frame stowed therein, wherein said auxiliary frame is located at a position away from the optical axis so as not to intercept a light beam passing through said locking frame; and a direction-of-movement restricting means for restricting the movement along the optical axis of said auxiliary frame is formed as an integral part of said locking frame on the inner surface thereof.

28. A lens barrel according to claim 27, wherein said auxiliary frame includes a motor for driving said lens frame along the optical axis.

* * * * *